(12) United States Patent
Boal

(10) Patent No.: US 10,346,874 B2
(45) Date of Patent: Jul. 9, 2019

(54) CHECKOUT-BASED DISTRIBUTED OF DIGITAL PROMOTIONS

(71) Applicant: Coupons.com Incorporated, Mountain View, CA (US)

(72) Inventor: Steven R. Boal, Los Altos, CA (US)

(73) Assignee: Quotient Technology Inc., Mountain View, CA (US)

( * ) Notice: Subject to any disclaimer, the term of this patent is extended or adjusted under 35 U.S.C. 154(b) by 0 days.

(21) Appl. No.: 13/831,716

(22) Filed: Mar. 15, 2013

(65) Prior Publication Data

US 2013/0204697 A1  Aug. 8, 2013

Related U.S. Application Data

(63) Continuation of application No. PCT/US2012/055810, filed on Sep. 17, 2012, and a continuation-in-part of application No. 13/332,317, filed on Dec. 20, 2011, and a continuation-in-part of application No. 13/233,557, filed on Sep. 15, 2011, now abandoned.

(51) Int. Cl.
*G06Q 30/00* (2012.01)
*G06Q 30/02* (2012.01)
*G06Q 10/00* (2012.01)

(52) U.S. Cl.
CPC ......... *G06Q 30/0253* (2013.01); *G06Q 10/00* (2013.01); *G06Q 30/02* (2013.01); *G06Q 30/0207* (2013.01); *G06Q 30/0222* (2013.01)

(58) Field of Classification Search
USPC ........................................... 705/14.1–14.73
See application file for complete search history.

(56) References Cited

U.S. PATENT DOCUMENTS 5,687,322 A   11/1997  Deaton et al.
6,456,981 B1   9/2002  Dejaeger
(Continued)

FOREIGN PATENT DOCUMENTS

CN        101802855 A     8/2010
KR        2004-0040253    5/2004

OTHER PUBLICATIONS

Korean Intellectual Property Office, Office Action in application No. PCT/US20112/055810 dated Mar. 15, 2013, 11 pages.

(Continued)

*Primary Examiner* — Michael W Schmucker
(74) *Attorney, Agent, or Firm* — Hickman Palermo Becker Bingham LLP

(57) ABSTRACT

Coupon information is provided electronically in association with receipts for transactions at physical stores and/or online stores. A retailer causes performance of a transaction in which one or more items are purchased. An interface configured to accept input indicating a customer identifier, such as an email address, associated with the transaction is provided. When input has been received via the interface, it is determined whether the identifier is associated with a known customer identity. If the customer identifier is associated with a known identity, digital coupons associated with that identity are applied against the transaction. An electronic receipt is further provided for the transaction via, for instance, the provided email address or a web-based application in which a session is established in connection with the identity.

9 Claims, 13 Drawing Sheets

(56) References Cited

U.S. PATENT DOCUMENTS

| | | |
|---|---|---|
| 6,839,680 B1 | 1/2005 | Liu |
| 6,876,978 B1 | 4/2005 | Walker et al. |
| 7,318,041 B2 | 1/2008 | Walker et al. |
| 7,640,240 B2 | 12/2009 | Boal et al. |
| 8,671,018 B2 | 3/2014 | Thomas |
| 2001/0032128 A1 | 10/2001 | Kepecs |
| 2002/0107728 A1 | 8/2002 | Bailey |
| 2004/0078282 A1* | 4/2004 | Robinson ............... 705/26 |
| 2004/0107135 A1 | 6/2004 | Deatherage |
| 2004/0167818 A1* | 8/2004 | Iwahashi ............... 705/14 |
| 2005/0097204 A1 | 5/2005 | Horowitz |
| 2005/0144066 A1 | 6/2005 | Cope et al. |
| 2005/0171845 A1 | 8/2005 | Halfman et al. |
| 2005/0286079 A1 | 12/2005 | Takagi |
| 2006/0080312 A1 | 4/2006 | Friedlander |
| 2006/0100931 A1 | 5/2006 | Deaton et al. |
| 2007/0073580 A1* | 3/2007 | Perry ............ G06Q 30/02 705/14.53 |
| 2007/0206209 A1 | 9/2007 | Mount |
| 2007/0208635 A1 | 9/2007 | Van Luchene et al. |
| 2008/0120155 A1 | 5/2008 | Pliha |
| 2008/0154676 A1 | 6/2008 | Suk |
| 2008/0300912 A1 | 12/2008 | Packes et al. |
| 2008/0319846 A1 | 12/2008 | Leming et al. |
| 2009/0037264 A1 | 2/2009 | Del Favero et al. |
| 2009/0099929 A1 | 4/2009 | Thibedeau |
| 2009/0171755 A1 | 7/2009 | Kane |
| 2009/0187462 A1 | 7/2009 | Gevelber et al. |
| 2009/0265228 A1 | 10/2009 | Sterling et al. |
| 2009/0271265 A1 | 10/2009 | Lay et al. |
| 2009/0299865 A1 | 12/2009 | Budgen |
| 2009/0313101 A1 | 12/2009 | McKenna et al. |
| 2010/0100434 A1 | 4/2010 | Sock |
| 2010/0121708 A1 | 5/2010 | Schultz |
| 2011/0029382 A1 | 2/2011 | Narasimhan |
| 2011/0060691 A1 | 3/2011 | Grossman et al. |
| 2011/0106600 A1* | 5/2011 | Malik et al. ............ 705/14.13 |
| 2011/0125561 A1 | 5/2011 | Marcus |
| 2011/0137719 A1 | 6/2011 | Song |
| 2011/0191180 A1 | 8/2011 | Blackhurst et al. |
| 2011/0231223 A1 | 9/2011 | Winters |
| 2012/0022956 A1 | 1/2012 | Payne et al. |
| 2012/0084132 A1 | 4/2012 | Khan |
| 2012/0136712 A1 | 5/2012 | Chang et al. |
| 2013/0046626 A1* | 2/2013 | Grigg et al. ............ 705/14.53 |
| 2013/0073363 A1 | 3/2013 | Boal |
| 2013/0080239 A1 | 3/2013 | Okerlund |
| 2013/0179239 A1 | 7/2013 | Patel |
| 2014/0180790 A1 | 6/2014 | Boal |
| 2014/0180793 A1 | 6/2014 | Boal |
| 2014/0180802 A1 | 6/2014 | Boal |
| 2014/0180807 A1 | 6/2014 | Boal |
| 2014/0180808 A1 | 6/2014 | Boal |
| 2014/0180809 A1 | 6/2014 | Boal |
| 2014/0180810 A1 | 6/2014 | Boal |
| 2014/0180826 A1 | 6/2014 | Boal |

OTHER PUBLICATIONS

Current Korean Claims in application No. PCTUS2012/055810 dated Mar. 2013, 5 pages.
Korean Intellectual Property Office, "Search Report", in application No. PCT/US2013/076926, dated Apr. 19, 2014, 19 pages.
Current Claims in Korean application No. PCT/US2013/076926, dated Apr. 2014, 27 pages.
U.S. Appl. No. 13/244,817, filed Sep. 26, 2011, Final Office Action, dated Feb. 18, 2015.
U.S. Appl. No. 13/233,557, filed Sep. 15, 2011, Final Office Action, dated Feb. 5, 2015.
European Patent Office, "Search Report" in application No. 12831316.0-1958, dated Jun. 23, 2015, 7 pages.
European Claims in application No. 12831316.0-1958, dated Jun. 2015, 5 pages.
U.S. Appl. No. 13/944,564, filed Jul. 17, 2013, Office Action, dated Nov. 17, 2016.
U.S. Appl. No. 13/944,558, filed Jul. 17, 2013, Interview Summary, dated Nov. 17, 2016.
U.S. Appl. No. 13/233,557, filed Sep. 15, 2011, Office Action, dated Nov. 1, 2016.
Boal, U.S. Appl. No. 13/244,817, filed Sep. 26, 2011, Office Action, dated Dec. 20, 2016.
The State Intellectual Property Office of the People's Republic of China, "Notification of the First Office Action" in application No. 201280055538.1, dated Jun. 3, 2016. 11 pages.
China Claims in Application No. 201280055538.1, dated Jun. 2016, 4 pages.
U.S. Appl. No. 13/944,549, filed Jul. 17, 2013, Office Action, dated Aug. 30, 2016.
U.S. Appl. No. 13/944,537, filed Jul. 17, 2013, Office Action, dated Aug. 22, 2016.
U.S. Appl. No. 13/944,514, filed Jul. 17, 2013, Office Action, dated Aug. 10, 2016.
U.S. Appl. No. 13/944,486, filed Jul. 17, 2013, Office Action, dated Aug. 25, 2016.
Belanger, U.S. Appl. No. 14/492,924, filed Sep. 22, 2014, Office Action, dated Mar. 9, 2018.
Boal, U.S. Appl. No. 13/944,564, filed Jul. 17, 2013, Office Action, dated Sep. 7, 2017.
Boal, U.S. Appl. No. 13/944,564, filed Jul. 17, 2013, Final Office Action, dated Jun. 16, 2017.
Boal, U.S. Appl. No. 13/944,558, filed Jul. 17, 2013, Office Action, dated Nov. 2, 2017.
Boal, U.S. Appl. No. 13/944,558, filed Jul. 17, 2013, Final Office Action, dated Jun. 28, 2017.
Boal, U.S. Appl. No. 13/944,549, filed Jul. 17, 2013, Final Office Action, dated Jul. 27, 2017.
Boal, U.S. Appl. No. 13/944,537, filed Jul. 17, 2013, Intervuew Summary, dated Aug. 21, 2017.
Boal, U.S. Appl. No. 13/944,537, filed Jul. 17, 2013, Final Office Action, dated Jul. 17, 2017.
Boal, U.S. Appl. No. 13/944,514, filed Jul. 17, 2013, Final Office Action, dated Jun. 19, 2017.
Boal, U.S. Appl. No. 13/944,486, filed Jul. 17, 2013, Final Office Action, dated Jul. 13, 2017.
Boal, U.S. Appl. No. 13/244,817, filed Sep. 26, 2011, Final Office Action, dated Oct. 13, 2017.
Boal, U.S. Appl. No. 13/944,486, filed Jul. 17, 2013, Office Action, dated Nov. 9, 2017.
Boal, U.S. Appl. No. 13/944,486, filed Nov. 17, 2013, Final Office Action, dated May 3, 2018.
Boal, U.S. Appl. No. 13/944,558, filed Jul. 17, 2013, Interview Summary, dated Dec. 20, 2017.
Boal, U.S. Appl. No. 13/944,549, filed Jul. 17, 2013, Office Action, dated Dec. 13, 2017.

* cited by examiner

From: Superstore Receipts (receipts@superstore.com)
To: Johnny Johnson (johnny@johnson.net)
Sent: August 15, 2011, 9:45 A.M. — 111
Subject: Your Superstore Receipt (#000293861)

110

120 — Johnny,

Thank your recent shopping trip to Superstore. Here is your electronic receipt.

130 — Transaction: #000293861  Terminal: 0313019
Date/Time: 08-15-2011, 09:36:12  Sales Rep: Miller, L.
135 — Superstore Location: Mountain View, CA (#313)

| Quantity | Item | Price | Total |
|---|---|---|---|
| 2 | Brand X Cereal — 141 | 2.99 | 5.98 |
|   | Coupon: Buy 1 Get 1 Free |  | -2.99 |
| 1 | Brand Y Dish Soap — 170 | 5.33 | 5.33 |
|   | Special Offers: — 142 |  |  |
|   | Save $2.00+ on Lunch Meat — 151 |  |  |
| 1 | Funny Movie (DVD) — 143 | 10.00 | 10.00 |
|   | Sneak Peak: Funny Movie II — 160 |  |  |
| 4 | Chocolate Candy | 0.49 | 1.96 |
| 1 | 1 ga. Brand Z Ice Cream - Rocky Road — 144 | 4.24 | 4.24 |
|   | Special Offer: — 145 |  |  |
|   | Try New Super Medicine, 2 for 1 — 152 |  |  |
|   | Tax (8.25%) |  | 2.02 |

140

180 — | | Total | | 26.54 |

| Payment: Cash |  | -6.54 |
| Payment: Credit Card XXXX-XXXX-XXXX-0001 |  | -20.00 |
| Special Offer: |  |  |
| Pay with Mobile Wallet and save |  |  |

190

— 153

Bonus Offer:
$5 off next Purchase — 154

CHECKOUT-BASED DISTRIBUTED OF DIGITAL PROMOTIONS

CROSS-REFERENCE TO RELATED APPLICATIONS; BENEFIT CLAIM

This application is a Continuation of International Application No. PCT/US12/55810, filed Sep. 17, 2012, and is also a Continuation-in-part of U.S. application Ser. No. 13/332, 317, filed Dec. 20, 2011, and is a also Continuation-in-part of U.S. application Ser. No. 13/233,557, filed Sep. 15, 2011. The entire contents of these three application is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments relate generally to coupon distribution, and, more specifically, to techniques for distributing coupons in association with electronic receipts.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general, a coupon is a certificate or other document that entitles its holder to accept an offer described or referenced by the coupon. The offer, also subsequently referred to as the "coupon offer," may be any type of offer, but typically is an offer by the coupon provider to provide a customer with one or more goods or services at a particular price or discount, or to provide the customer with a gift in exchange for the performance of an act, such as purchasing a good or service. A coupon often takes a "hard copy" form, such as a paper certificate, with printed images and/or text describing terms of the offer. The process of the customer accepting a coupon offer by presenting, referencing, or otherwise providing a coupon while purchasing, contracting, or otherwise transacting with another party is "redeeming" the coupon. For example, a customer may redeem a hard copy of a coupon by handing the copy to a clerk during a purchase at a retail store. The clerk may then provide the customer with the offered discounted price or gift.

One technique for distributing coupons is to include printed coupons with newspapers, magazines, or other items that are distributed to customers. One example of an item with which coupons are distributed is a printed receipt. For example, some retailers print receipts at a point of sale on register paper on which coupons have been pre-printed. As another example, some retailers print coupon(s) on a receipt at the time of the transaction for which the receipt is printed, thereby allowing the retailers to dynamically select which coupon(s) appear on the receipt based on the product(s) that were purchased during the transaction.

Recent distribution techniques now provide customers with opportunities to print their own coupons. For example, a number of websites provide search engines or catalogs with which customers may locate offers and then print coupons for the offers they find. The printed coupons may be used in the same manner as any other coupon.

Other recent distribution techniques involve creating digital coupons. One such technique involves creating unique digital coupons that are saved to an account associated with the customer, such as a store loyalty account. The customer may redeem such digital coupons during online or physical transactions by presenting an account identifier, such as a store loyalty card or an oral identification of the customer's telephone number, for the associated account. Since many customer accounts are tied to card-based identifiers, such as store loyalty cards or credit cards, the process of storing a digital coupon identifier to an account may also be referred to as saving a coupon to a card. Some examples of such techniques are described in U.S. application Ser. No. 12/878, 231, filed Sep. 9, 2010, the entire contents of which are hereby incorporated by reference for all purposes as if fully set forth herein.

Another digital coupon-based technique involves creating unique digital coupons that may be stored on a computing device. The digital coupons may be transmitted from the computing device to a point-of-sale during a transaction using any of a variety of mechanisms. For example, information about the digital coupon may be uploaded to the point-of-sale during an online transaction involving the computing device. As another example, information about the digital coupon may be transmitted wirelessly from a smartphone to a receiving component coupled to a checkout register during a transaction at a brick-and-mortar store.

BRIEF DESCRIPTION OF THE DRAWINGS

In the drawings: FIG. 1 illustrates an email comprising an electronic receipt with coupon information that has been provided to an electronic address of a customer;

DESCRIPTION OF EXAMPLE EMBODIMENTS

Figure 2:
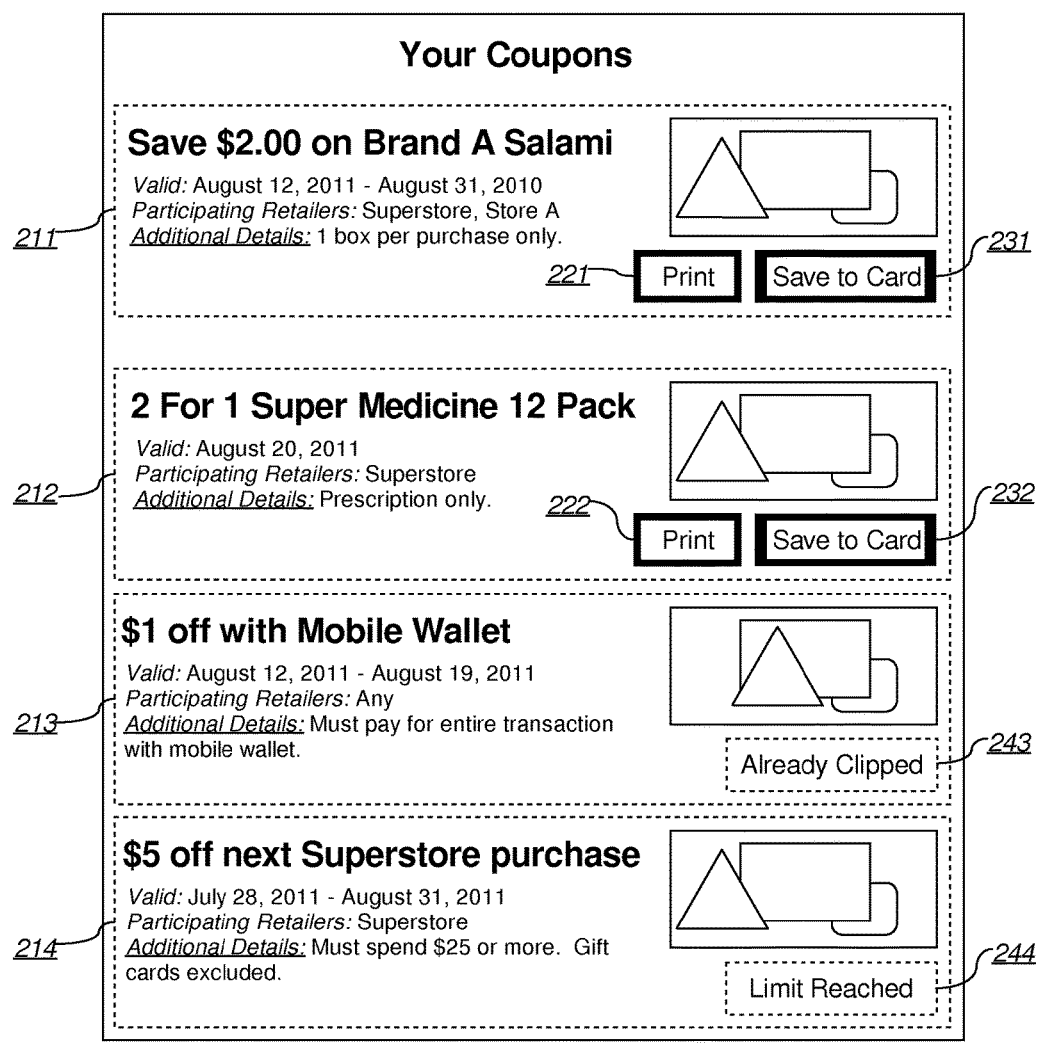
FIG. 2 depicts an example graphical user interface with which a user may view and select coupon offers.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches, techniques, and mechanisms are disclosed for electronically providing coupon information in association with receipts. According to one embodiment, an interface configured to accept input indicating a customer identifier associated with the transaction is provided. When input indicating a customer identifier has been received via the interface in association with the transaction, it is determined whether the customer identifier is associated with any known customer identity. If so, then digital coupons are identified for the known customer identity. Input is received specifying one or more items for purchase by a customer. Based on the input, a transaction is completed in which the one or more items are purchased. The identified digital coupons may be applied against the transaction. When the customer identifier has been received and the customer identifier is associated with a known customer identity, an electronic receipt is provided via an electronic address associated with the known customer identity. The electronic receipt for the transaction may be provided to the customer instead of a printed receipt. A printed receipt is provided when no customer identifier has been received, or when a provided customer identifier is not associated with any known customer identity. In an embodiment, some or all of these elements are performed by a retail terminal at a physical store, with possible assistance from a retailer-based server. In an embodiment, servers operated by other entities, including a coupon distributor, may assist in the determining and providing.

In an embodiment, when the customer identifier has been received and the customer identifier is associated with the electronic address, an electronic receipt for the transaction is provided to the customer via the electronic address instead a printed receipt. The electronic receipt includes the coupon information. When no customer identifier has been received, or when a received customer identifier is not associated with any electronic address, a printed receipt is provided for the transaction.

In an embodiment, the electronic receipt further provides coupon information by which the customer may obtain new coupons. In an embodiment, provision of the coupon information comprises sending an email to the customer with a link to a website at which information for one or more coupon offers may be obtained. In an embodiment, the coupon information includes data describing one or more coupon offers and one or more links by which the customer may obtain one or more coupons for the one or more coupon offers. In an embodiment, the coupon information includes or links to information that includes one or more links by which the customer may cause one or both of: printing one or more coupons for the one or more coupon offers or saving one or more digital coupons for the one or more coupon offers to an account associated with the customer identifier.

In an embodiment, provision of the coupon information comprises a retailer sending transaction information and an account identifier associated with the customer identifier to a coupon distributor, and the coupon distributor providing the coupon information via the electronic address. In an embodiment, provision of the coupon information comprises the retailer sending account identifying information associated with the customer identifier to a coupon distributor. In response to sending the account identifying information, the retailer receives the coupon information from the coupon provider. The retailer then provides the coupon information with an electronic receipt via the electronic address. In an embodiment, providing the coupon information with the electronic receipt comprises sending the coupon information with the electronic receipt to a mobile device operated by the customer.

In an embodiment, a coordinating computer is queried to determine whether the customer identifier is associated with a known customer identity. The determining of whether the customer identifier is associated with a known customer identity implicitly determines whether the customer identifier is associated with any electronic address of the customer.

In an embodiment, account identifying information is received for a transaction between a retailer and a customer. An account associated with the account identifying information is identified. Digital coupons associated with the account are also identified and provided to the retailer. Transaction information is received for the transaction, the transaction information including account identifying information and coupon redemption information. An electronic receipt is generated based on the transaction information. The electronic receipt is provided with optional coupon information via an electronic address associated with the account. In an embodiment, the coupon information and electronic receipt are provided by a retail server, with possible assistance from a coupon server in identifying the one or more coupon offers. In an embodiment, the coupon information and electronic receipt are provided by a coupon distributor or other entity that is separate from the retailer.

In an embodiment, providing the electronic receipt with the coupon information via the electronic address comprises: sending an email to the electronic address, the email including a link configured to send a login request to a server; receiving, at the server, the login request from a client; receiving, at the server, in association with the login request, credentials corresponding to the account; and in response to the server receiving the login request and the credentials, sending the electronic receipt and coupon information to the client.

In an embodiment, the electronic address is one of an email address, a phone number, a social networking address, or a uniform resource locator. In an embodiment, selection of the one or more coupon offers is based on factors that do not target the behavior of the customer. In an embodiment, selection of the one or more coupon offers is based upon one or more of: the one or more items involved in the transaction, transaction information, customer preferences, retailer preferences, customer purchase history, or customer coupon redemption history. In an embodiment, upon selecting the one or more coupon offers, one or more digital coupons for the one or more coupon offers are automatically saved to the customer's account. In an embodiment, the customer identifier is one of a customer loyalty card number, credit card number, radio-frequency identifier ("RFID"), hardware address, or phone number.

In an embodiment, the method is performed by an entity other than the retailer. Second transaction information is received for a second transaction between a second retailer and the customer, the second transaction information including second account identifying information. The account is identified as being associated with the second account identifying information. Second coupon information is provided via the electronic address associated with the account.

The second coupon information may be the same as, or different from, the original coupon information. In an embodiment, the second coupon information is provided with a second and different electronic receipt generated based on the second transaction information.

In other aspects, the invention encompasses computer apparatuses and computer-readable media configured to carry out the foregoing steps.

2.0. Electronic Receipts

Various embodiments involve providing customers at brick-and-mortar stores with electronic receipts instead of, or in addition to, printed receipts. The electronic receipts may be provided to the customers in a variety of ways. For example, the electronic receipt may be included in or attached to an email. Or, the electronic receipt may be provided in a web page on a website hosted by the retailer or a third-party, such as an account history page or "digital locker" of receipt data. In an embodiment, the customer may access the web page at any time after the transaction by logging into the website using credentials that authenticate the customer. In an embodiment, the customer receives a link to the web page via email, a text message, or any other electronic address, including private messaging addresses on social networks. The customer provides a suitable address for the receipt during the transaction. Or, the customer provides an identifier, such a store loyalty card or RFID tag, to the retailer so that a suitable electronic address to which to provide the electronic receipt may be located.

As yet another example, the customer may obtain an electronic receipt using a dedicated transaction management application. The dedicated transaction management application, which may also double as a payment application and/or coupon application, may communicate with a server to obtain receipt data that has been uploaded by retailers in association with an account belonging to the customer. The application may then organize that receipt data for presentation to the customer. In an embodiment, the transaction management application may monitor the account for new receipts periodically, or receive push-notifications of receipts from the server. The receipt management application may then notify the customer when a new receipt is available.

Various embodiments may also or instead involve providing customers with coupon information via an electronic address in response to the completion of a transaction. The coupon information may include digital coupons themselves, and/or links to locations at which the customer may print or otherwise obtain coupons. In an embodiment, coupon information is embedded in an electronic receipt.

2.1. Example Electronic Receipt

FIG. 1 depicts a display of an email 100 comprising an electronic receipt 130 with coupon information 151-154 that has been provided to an electronic address 111 of a customer. Email 100 may be displayed in the depicted manner by, for example, a client-based or web-based email application that interprets various fields, metadata, and or markup language included in email 100. Email 100 comprises a variety of header metadata 110, some or all of which may be displayed at the top of the email. Header metadata 110 may include, for example, an electronic address 111 of a customer. Email 100 may further include a message 120.

Electronic receipt 130 of email 100 is depicted in FIG. 1 as one or more hyper-text markup language ("HTML") tables, but in other embodiments the electronic receipt may take any suitable form. Electronic receipt 130 comprises transaction details 135, such as a transaction number, a time or date of the transaction, a store location at which the transaction took place, an identifier for a terminal at which the transaction took place, the name of a sales representative that assisted in conducting the transaction, the name of the customer, and so forth. Electronic receipt 130 further comprises an item list 140 of items 141-145 that were purchased in the transaction, a transaction total 180, and payment data 190.

Item list 140 may include, in association with items 141-145, basket-level details such as the quantities of each item purchased, a price for each item, coupon redemption data 170 for coupons applied to the transaction, tax data, SKU numbers, and so forth. Payment data 190 may contain a list of each payment mechanism applied to the transaction, along with any balance remaining.

Coupon information 151-152 is intermingled within item list 140. Specifically, coupon offer link 151 is displayed after item 142 and coupon offer link 152 is displayed after item 145. As depicted, the coupon offer(s) associated with links 151 and 152 are selected at random. However, in other embodiments the offers associated with coupon information 151-152 may have been selected for inclusion in email 100 based on items 142 and 145, respectively. Coupon information 153 is displayed in association with payment information 190, and the offer associated therewith may have been selected for inclusion in all receipts provided via email. Alternatively, in an embodiment, coupon information 153 may have been selected for inclusion in email 100 because of the payment method chosen by the customer. Coupon information 154 is displayed at the end of the email, and the corresponding offer may have been selected for any of a number of reasons as discussed herein. In other embodiments, coupon information 151-154 may be entirely intermingled with the electronic receipt 130, or displayed entirely separate from the electronic receipt 130.

As depicted, coupon information 151-154 includes a link to the location(s) of one or more coupon offers, along with short description(s) of the offer(s) available on those pages, designed to encourage the customer to click on the links. Each coupon link 151-154 may link to a same or different location. For example, each link may take the customer to a different coupon offer page on the website of a coupon provider. Each coupon offer page may comprise one or more coupon offers relevant to the selected link. Or each link may take the customer to a same page containing all of the indicated coupon offers.

In other embodiments, coupon information 151-154 may include additional information about the available coupon offers, such as a list of eligible products and store locations, expiration dates, discount amounts, and other terms. In an embodiment, coupon information 151-154 may include controls associated with each indicated coupon offer, such as a "Print now" button or "Save to Card" button, by which the customer may immediately download, print, and/or save a coupon for the indicated offer. In an embodiment, coupon information 151-154 may be part of a form comprising a checklist or pull-down menu of coupon offers and controls for printing, saving, or otherwise accessing coupons for any offer that the customer selects via the form. In an embodiment, coupon information 151-154 may indicate to the customer coupons that have automatically been added to the customers' account in response to the transaction.

Email 100 may optionally include relevant advertisement data, such as advertisement 160, that is not a coupon. For example, as depicted, advertisement 160 is a special promotion that provides the customer with access to a multimedia item related to the purchased item 143.

Email 100 is one example of a technique for providing a customer with an electronic receipt. In other embodiments, the electronic receipt may be embedded in differently formatted emails, other types of messages, web pages, and/or documents. Furthermore, electronic receipt 130 may include more or less transaction data, in varying arrangements. In an embodiment, email 100 comprises only electronic receipt 130 or only coupon information 151-154. In an embodiment, the information in email 100 may be divided amongst multiple electronic addresses. For example, the coupon information 151-154 may be in a different email or on a web page. In an embodiment, the coupon information 151-154 is substituted in email 100 with single link having a label such as "Access Your Coupons."

2.2. Example Coupon Selection Interface

FIG. 2 depicts an example graphical user interface ("GUI") 200 with which a user may view and select coupon offers. GUI 200 may be displayed, for example, by a dedicated coupon client or a web browser executing instructions from a coupon distribution server. The user may arrive at GUI 200, for example, by selecting links 151-154 in email 100, or by launching a general purpose coupon interface and then navigating to a section at which coupons selected for the user are presented. For example, selecting links 151-154 may launch a web browser to a Uniform Resource Locator ("URL") at a retail server or coupon distribution server. The user may or may not be required to first log in to his or her account. In an embodiment, the URL may be a general purpose URL, and the coupon offers displayed in GUI 200 may have been selected without regard to any transaction. In an embodiment, the URL, or accompanying data, may identify to the server the specific offers displayed in GUI 200. In an embodiment, the URL, or accompanying data, may instruct the server to locate offers that were identified for the user in response to recent transactions or a specific transaction.

As another example, selecting links 151-154 may launch a dedicated coupon client that interfaces with a coupon distribution server. Selecting links 151-154 may launch the dedicated coupon client with input such as an account identifier, offer identifiers, and/or transaction identifiers. The dedicated coupon client may then use the inputted information to request that the coupon distribution server provide data such as depicted in GUI 200. The dedicated client may then generate GUI 200.

As another example, the user may launch a mobile coupon client on a smartphone, without having selected a link in an electronic receipt. The user may then navigate to a screen entitled "Special Offers," which displays offers downloaded by the client from an electronic address based on credentials entered by the user. In an embodiment, the mobile client may have notified the user that new offers are available prior to the user having launched the coupon client.

In an embodiment, GUI 200 displays information about coupon offers 211-214. The displayed information includes controls 221-222 for printing offers 211-212 respectively. The displayed information further includes controls 231-232 for saving offers 211-212, respectively, to a user's account. There are no controls for selecting offer 213, but rather an indicator 243 that the offer 213 has already been saved to the user's account. Likewise, there are no controls for selecting offer 214, but rather an indicator 244 that the offer 214 has already reached a distribution limit.

Selection of the controls 221-222 or 231-232 may result in the issuance of a request to a coupon distribution server to generate a coupon for the corresponding coupon offer. Selection of one of print controls 221-222 may more specifically result in the client downloading a printable coupon for the corresponding coupon offer and outputting the downloaded coupon to a printer. Selection of one of controls 231-232 may more specifically result in the client sending a user identifier or session identifier to a coupon distribution server, along with a request to store a digital coupon for the corresponding coupon offer in an account associated with the user identifier or session identifier.

GUI 200 may optionally include fields that explain why some or all of the offers are being presented to the user. For example, a note next to one of the coupon offers may explain to the customer that the offer was selected for the customer because of an item purchased in a specific transaction. The field may even include a link to another interface, such as another web page, from which the user may review details for the specific transaction, such as receipt data 130. In an embodiment, the field may further include a control by which the user may express a preference to not receive future coupon offers related to the purchased items.

GUI 200 is one example of an interface that may be displayed for selecting coupons. Other interfaces may include additional or less information in varying arrangements. For example, an interface may only include offers related to a single link 151-154 of email 100. As another example, an interface may only allow a user to print coupons, or only allow the user to save coupons.

3.0. Functional Overview

3.1. Conducting the Transaction

Figure 3:
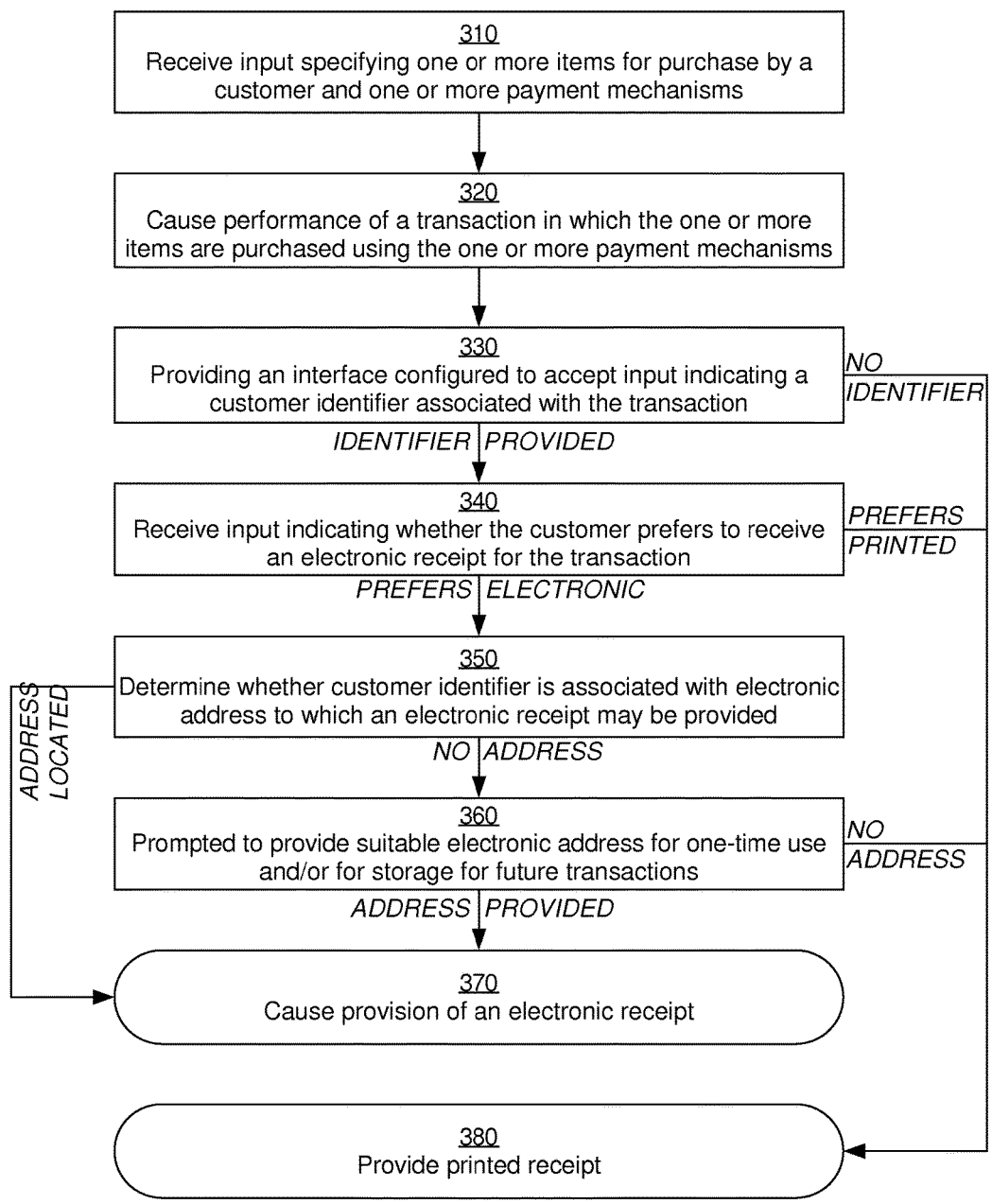
FIG. 3 illustrates a method flow for conducting a transaction in which an electronic receipt may be provided.

FIG. 3 illustrates a method flow 300 for conducting a transaction in which an electronic receipt may be provided, according to an embodiment.

Block 310 comprises receiving input specifying one or more items for purchase by a customer and, optionally, one or more payment mechanisms. For example, the input may be received by a cash register or other terminal at a checkout stand in a brick-and-mortar store, and/or a retail server, payment server, or other server to which such input has been relayed. The input specifying the one or more items may involve, for instance, scanning Universal Product Code ("UPC") symbols, detecting RFID or Near-Field Communication ("NFC") tags, weighing products, entering item identifiers via a keyboard, selecting items via a touchpad, and so on. The input specifying the one or more payment mechanisms may include, for instance, swiping a credit card through a magnetic reader, detecting an RFID or NFC tag, the tendering of cash or a credit card, a transfer of funds via a mobile payment application on a mobile device, and so on.

Block 320 comprises performing, or causing the performance of, a transaction in which the specified one or more items are purchased, optionally using the one or more provided payment mechanisms. For instance, the entity receiving the input of block 310 may calculate a total price for the transaction based on the one or more items, and then send a request to one or more payment providers to transfer the relevant funds to the retailer. Once the one or more payment providers have responded with an acknowledgment that the transfer has been approved, the entity may consider the transaction complete. As another example, the terminal may await confirmation from a cashier that appropriate payment has been received, such as the cashier entering a sum of money or other tender that the customer has provided the cashier. Once the transaction is considered complete, the entity performing block 320 may proceed, or instruct the terminal to proceed, with any of blocks 330-380, depending on whether any of blocks 330-380 were performed prior to the completion of the transaction.

Block 330 comprises providing an interface configured to accept input indicating a customer identifier associated with the transaction. For instance, the interface may be a magnetic card scanner, an RFID or NFC reader, a touchscreen, a biometric scanner, a keypad, facial recognition software, and so forth. Depending on the environment, the customer identifier may comprise any of, for instance, a store loyalty card number, a credit card number, an NFC or RFID tag, a hardware identifier, a phone number, a license number, biometric data, a user name, and so forth. In an embodiment, multiple interfaces capable of receiving input identifying multiple types of identifiers may be provided.

The interface may be configured to accept the input indicating the customer identifier at different specific times relative to blocks 310-320. For example, the interface may be configured to accept the input immediately before payment, immediately before scanning items for purchase, or upon completion of the transaction. The interface may instead be configured to accept the input at any range of times relative to blocks 310-320, such as at any time before the customer provides payment, or at any time up until a paper copy of a receipt is printed. In an embodiment, the input is received at any time during a window in time that can be uniquely tied to the transaction.

In an embodiment, the cashier and/or terminal prompt the customer to provide the input via the interface. In an embodiment, the cashier enters the input on behalf of the customer. For example, the cashier may invite the customer to provide an identifier such a store loyalty card prior to receiving payment or even scanning items for purchase. Or, the cashier may invite the customer to provide a user name, email address, or phone number at the end of the transaction, if the customer would prefer to receive an electronic receipt.

The interface may be configured to serve multiple purposes. For example, the interface may be a magnetic scanner capable of reading magnetic stripes of both payment mechanisms, such as credit cards, and customer identification mechanisms such as loyalty cards. The interface may include prompts that indicate to the customer when to provide the customer identifier, as opposed to when to provide other input. Or, the differences between the types of input received by the interface may be sufficient enough that the entity processing the input can easily distinguish between a customer identifier and other input. The customer identifier may likewise serve multiple purposes. The terminal or retail server may, for example, also use the customer identifier to locate information such as digital coupons that are available to the customer, a rewards account for the customer, or a payment account for the customer. In an embodiment, an email address or store loyalty card number may also be utilized to provide a customer with benefits such as coupon redemption or membership discounts, or even to identify a suitable payment mechanism.

The receipt of input via the provided interface of block 330 is optional. In an embodiment, failure to receive input via the interface of block 330 before the expiration of a certain amount of time, or before certain terminal events such as the completion of the transaction or the pressing of a "Print Receipt" button, may be interpreted as the customer's implicit refusal of the option to receive an electronic receipt for the transaction, per block 340.

Block 340 comprises receiving input indicating whether the customer prefers to receive an electronic receipt for the transaction. In an embodiment, block 340 occurs in response to a prompt from the cashier or terminal, such as "Do you want a paper or electronic receipt?" or "May I email you your receipt?" The input may be received in a variety of manners, including the pressing of a key on a keypad or button on a touchpad. In an embodiment, the input of block 340 is the same as that of block 330. That is, the customer provides input indicating the customer identifier in response to being prompted to indicate whether the customer would prefer an electronic receipt.

In an embodiment, the input of block 340 is received immediately prior to the provision of the interface for inputting the customer identifier. For example, the cashier may ask the customer if the customer would like an electronic receipt. If the customer responds affirmatively, the cashier may then prompt the customer to swipe a customer loyalty card or provide a phone number.

In an embodiment, the input of block 340 may be implicit from the customer having provided a customer identifier in block 330. In an embodiment, if the customer identifier serves multiple purposes, the customer may be prompted to indicate whether the customer prefers to receive an electronic receipt even though the customer has provided a suitable customer identifier.

In an embodiment, the input of block 340 is received before the transaction, in the form of a customer preference for all transactions between the customer and retailer, or even between the customer and multiple retailers. The customer may have previously expressed a preference to always receive electronic receipts, for example, during a registration process, account management operation, or previous transaction. Data indicating this preference may be stored in association with the customer identifier or a corresponding customer account. The transacting terminal or server may look to see if the preference has been stored in association with the customer identifier or the corresponding account prior to prompting the customer for the input of block 340. Or, the preference may be communicated along with the customer identifier when the customer provides the customer identifier via a mobile device.

In an embodiment, the input of block 340 is optional. For example, a retailer may assume that a customer prefers a paper receipt unless the customer proactively states otherwise. Or the retailer may assume that the customer prefers an electronic receipt whenever possible.

If input indicating a customer identifier has been received via the interface of block 330 in association with the transaction, and if the customer indicated (or was assumed to have) a preference for an electronic receipt per block 340, then at block 350 it is determined whether the customer identifier is associated with a suitable electronic address to which an electronic receipt may be provided. Depending on the embodiment, the electronic address may take any of a variety of forms, including an email address, text messaging number, social messaging user name, URL, website user account, and so on.

The determination may be accomplished using a variety of techniques. For example, a terminal may query a retail server using the customer identifier to determine whether customer identifier is mapped in a database table to a suitable electronic address. As another example, a retail server may query a database server of store loyalty accounts to determine whether the customer identifier is associated with any of the store loyalty accounts. If necessary, the retail server may then make an additional query to the database server to see if an electronic address has been registered with the corresponding store loyalty account. As another example, a retail server may query a server hosted by a coupon provider or shopping incentive provider to determine whether the customer identifier is registered to a customer account.

In an embodiment, the determination of whether a customer identifier is associated with a suitable electronic address is accomplished implicitly. For example, a retail server or coupon server may store information identifying a number of known customer identities. Each customer identity is assumed to be associated with a suitable electronic address either because of procedures followed when registering the customer identities, or because the server features logic for providing electronic addresses such as personalized web pages for each customer identity. The determination of block 340 may thus be accomplished by determining whether the customer identifier is associated with a known customer identity.

Optionally, at block 360, if the customer had indicated a preference to receive an electronic receipt, but had not provided a customer identifier that was associated with a suitable electronic address, the customer may be prompted to provide a suitable electronic address for one-time use and/or for storage for future transactions.

If the customer indicated (or was assumed to have) a preference for an electronic receipt per block 340, and if a suitable electronic address has been located per block 350 or 360, flow proceeds to block 370. Block 370 comprises causing provision of an electronic receipt, such as depicted in FIG. 1, via an electronic address associated with the account. The electronic receipt optionally includes coupon information, such as a link to a website comprising coupon offers distributed by the retailer and/or the coupon distributor, or data identifying one or more specific coupon offers for which the customer is eligible. The identification and provision of such coupon information is described in subsequent sections.

Block 370 may be performed, for instance, by the terminal and/or the retail server directly providing the electronic receipt to an electronic address. The terminal and/or the retail server may or may not work in coordination with a coupon server to identify relevant coupon information to include in the electronic receipt. In an embodiment, block 370 comprises the terminal and/or the retail server sending transaction data and either the electronic address or account identifying information for locating the electronic address to a coordinating server. The coordinating server may be operated by any entity capable of providing electronic receipts to the electronic address, including a server operated by a coupon provider, payment provider, shopping incentive provider, or dedicated receipt provider. The coordinating server may work with a coupon server or retail server to identify relevant coupon information, if necessary.

If the customer indicated (or was assumed to have) a preference for a printed receipt per block 340, or if a suitable electronic address is not located per block 350 or 360, flow proceeds to block 380. Block 380 comprises the terminal printing a receipt for the transaction. The receipt may optionally include coupon information identified using any suitable technique.

Flow 300 is one example of the variety of possible techniques for conducting a transaction in which an electronic receipt is provided. Other embodiments may include additional or fewer elements in varying orders. For example, while flow 300 depicts an embodiment in which a customer is provided an electronic receipt instead of a printed receipt, other techniques may allow a customer to select both a printed receipt and an electronic receipt. In yet other embodiments, a terminal never provides printed receipts. Rather, a customer only has the option of receiving an electronic receipt.

In embodiments, the electronic receipt is provided directly to a mobile device operated by the customer. In embodiments, the terminal may send the electronic receipt via a wireless link to an electronic address that is either already known to belong to the customer as a result of blocks 310-330, or to a proximity-based communication interface presumed to belong to the customer. For example, the customer may obtain the receipt by placing a mobile device near an NFC-capable terminal, and then either receive the electronic receipt directly via NFC or indirectly via back-end communications that were initiated using information transmitted via NFC. As another example, the customer may use a mobile application on the mobile device to pay for the transaction, and then receive the electronic receipt via the mobile application upon completion of the transaction. The explicit identification of an electronic address in block 350 may not be necessary in such embodiments.

Figure 4:
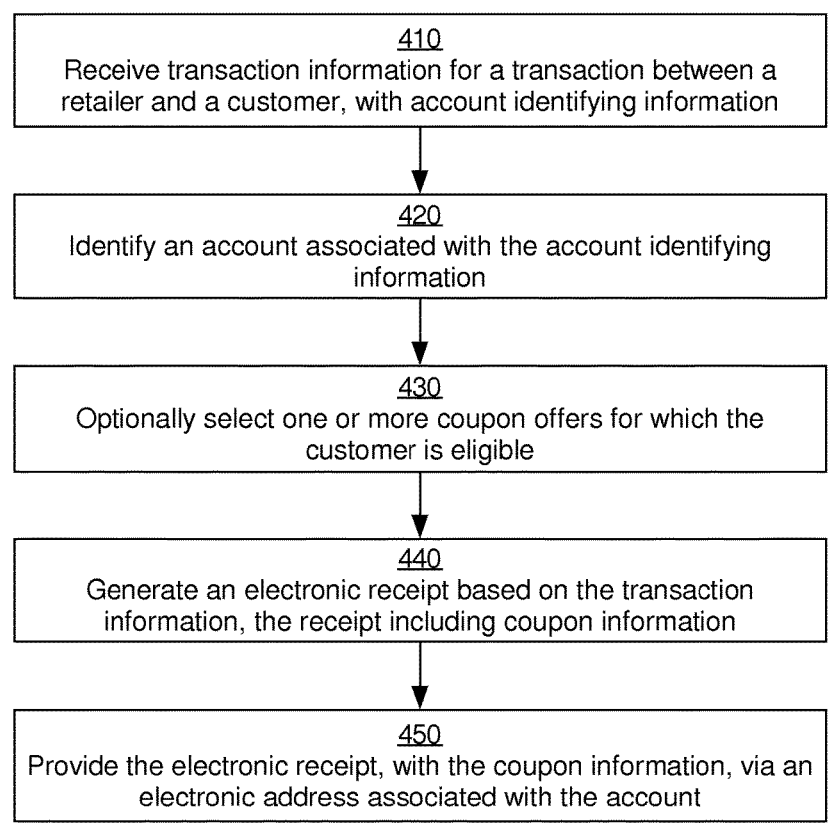
FIG. 4 illustrates a method flow for electronically providing coupon information in association with a receipt for a transaction conducted at a brick-or-mortar store.

3.2. Electronically Providing Coupon Information in Association with a Receipt FIG. 4 illustrates a method flow 400 for electronically providing coupon information in association with a receipt for a transaction conducted at a brick-or-mortar store, according to an embodiment. Flow 400 may be performed by a variety of entities, depending on the embodiment, including the retailer, a retail server, a payment server, a coupon server, and/or any other suitable computing device.

Block 410 comprises receiving transaction information for a transaction between a retailer and a customer, such as a transaction completed per block 320 of FIG. 3. The transaction information includes account identifying information. The transaction information may also include various transaction details, such as a total price, a list of items purchased, information about coupons or other discounts applied to the transaction, and so forth. Depending on the embodiment, the transaction information may be received from any of the terminal, retail server, payment provider, or even the coupon server.

The granularity of the transaction information may vary from retailer to retailer. For example, some retailers may provide only a total price, while others may provide detailed line-item descriptions of each item purchased. In an embodiment, the transaction information may include pre-formatted receipt data or templates, to which coupon information may be added. In an embodiment, the transaction information contains no such formatting. The account identifying information may be, for instance, a customer identifier received per block 330 of FIG. 3, or an account number retrieved using the customer identifier.

Block 420 comprises identifying an account associated with the account identifying information. Block 420 may involve querying one or more databases of account information held locally with the performing entity and/or at a coupon server. Block 420 further comprises identifying an electronic address associated with the account.

Block 430, which is optional, comprises selecting one or more coupon offers for which the customer is eligible. Block 430 may involve querying a coupon database, either directly or via a coupon server, to retrieve coupon offers. In an embodiment, a variety of non-behavioral targeting mechanisms may be used to select the one or more coupon offers, such as random algorithms, timestamps, campaign targets, and so forth. In an embodiment, the criteria used to select coupons may be associated with various aspects of the transaction information, such as keywords selected from item descriptions and item identifiers. In an embodiment, the one or more coupon offers may be selected based upon one or more of: the one or more items involved in the transaction, transaction date and/or time, amount spent, customer preferences, retailer preferences, customer purchase history, retailer identity, store location, or customer coupon redemption history. In an embodiment, only a certain number of coupon offers may be selected. To this end, block 430 may comprise ranking coupon offers or requesting that a coupon server rank coupon offers according to criteria such as described above. In an embodiment, the selected coupons may be limited to those having a certain score in a ranking function. Any suitable techniques for selecting and ranking coupon offers may be utilized.

Block 440 comprises generating an electronic receipt based on the transaction information, such as depicted in FIG. 1. Block 440 may therefore entail formatting both the transaction information and coupon information as an electronic receipt. The formatting may be done in conformance with template data and/or logic for structuring an electronic receipt based on the transaction information. In an embodiment, the electronic receipt may include logos, slogans, text, and links uploaded or otherwise provided by the retailer for use in all of the retailer's electronic receipts. In an embodiment, the coupon information included in the generated electronic receipt may include one or more links to a website or other resource at which detailed information about coupon offers may be obtained, specific information about offers selected per block 430, and/or links for obtaining coupons for specific coupon offers.

Block 450 comprises providing the electronic receipt, with the coupon information, via an electronic address associated with the account. Block 450 may involve, for example, sending an email with the coupon information to an email address that is stored in association with the account. Block 450 may alternatively involve receiving a client request directed a particular URL, and responding to the request with an electronic receipt. The particular URL may be, without limitation, a URL that was emailed or texted to the customer, the URL of a page displayed by a coupon web application upon the customer logging into the web application, a URL corresponding to the transaction in a transaction history for the customer, or a URL corresponding to XML-based data that is fed to a mobile application operated by the customer. The electronic receipt may have been generated prior to receiving the request from the client. Alternatively, the transaction data may be stored in a database. In response to the user requesting the particular URL from the server, the server dynamically generates the electronic receipt per block 440, using the stored transaction data. Block 430 may also be performed prior to or in response to the request for the particular URL.

In an embodiment, the coupon information includes or links to other information that includes an identification of one or more mechanisms by which the customer may cause one or both of printing one or more coupons for the one or more coupon offers or saving one or more digital coupons for the one or more coupon offers to the account associated with the customer identifier. The mechanisms may involve, for instance, one or more URLs that request that a coupon server generate a coupon for the selected coupon offer. In an embodiment, the coupon information includes printable copies of the one or more coupon offers. In an embodiment, one or more digital coupons are generated in block 430 and saved to the customer's account. Block 450, then, comprises informing the customer of the existence of the digital coupons in the customer's account.

Flow 400 one example of the variety of possible techniques for electronically providing coupon information in association with a receipt for a transaction. Other techniques may involve additional or fewer elements, in varying orders. For example, in an embodiment, the electronic address is received directly from the terminal or retail server. The account identifying information and the account itself may therefore be unnecessary.

4.0. Example System Architecture

Figure 5:
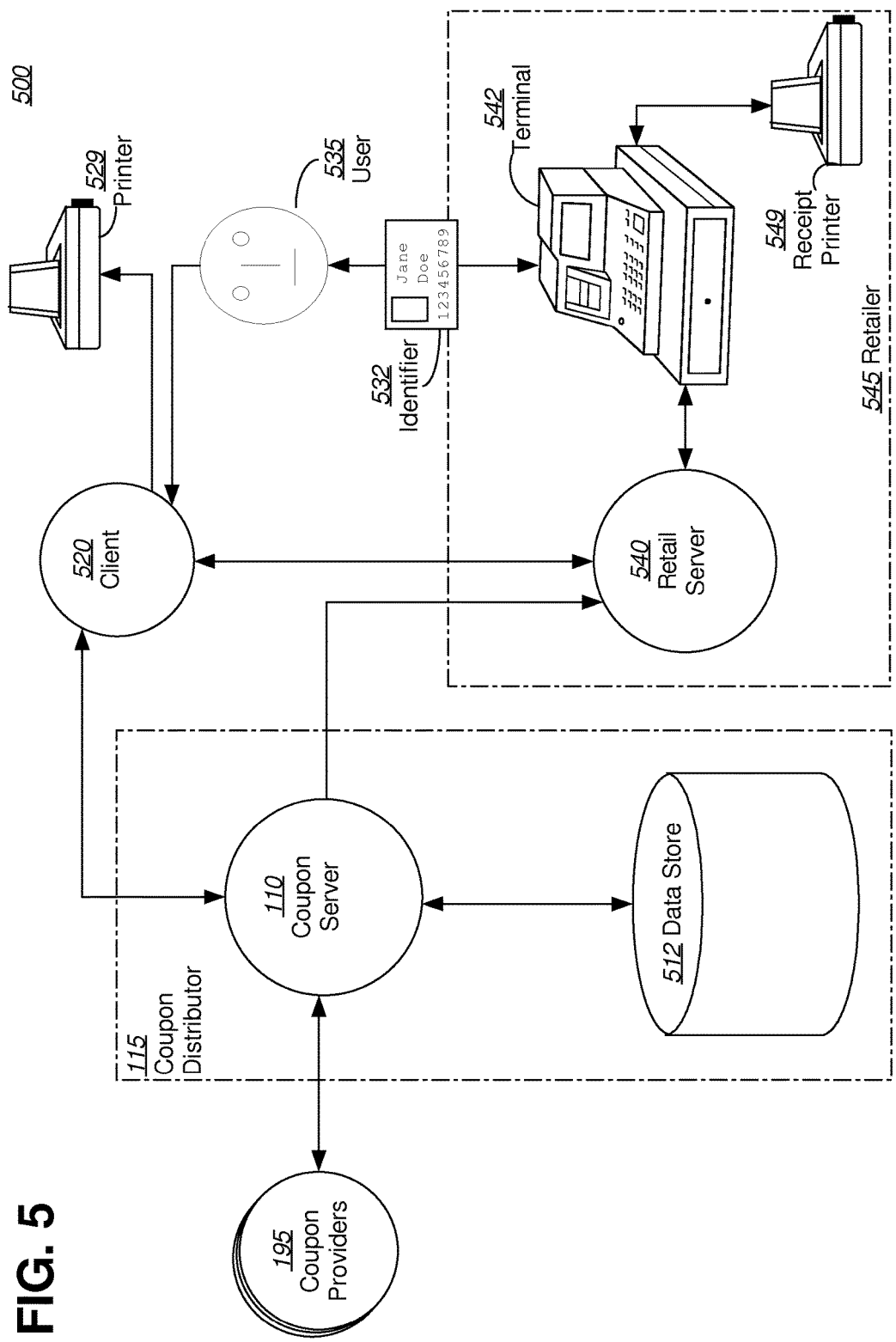
FIG. 5 illustrates an example system in which the techniques described herein may be practiced.

FIG. 5 is a block diagram illustrating an example system 500 in which the techniques described herein may be practiced, according to an embodiment. System 500 comprises a coupon server 510 operated by a coupon distributor 515, a client 520 operated by a customer 535, and a retail server 540 and terminal 542 operated by a retailer 545.

4.1. Retailer

Retailer 545 is any entity that conducts transactions in which customers, such as customer 535, redeem coupon offers via the coupons distributed by coupon server 510. Retailer 545 may be a single store, or a corporation that operates a group of stores. Customer 535 may engage in transactions with retailer 545 at, for example, a brick-and-mortar store operated by retailer 545. Customer 535 may also engage in transactions with retailer 545 via a website operated by or on behalf of retailer 545.

A transaction as used herein refers to the act of a retailer such as retailer 545 obtaining payment for the provision of, or the formation of a contract to provide, certain product(s) and/or service(s). Obtaining payment may include receiving a physical or electronic transfer of payment, debiting an account, obtaining a hold on funds, securing funds in escrow, obtaining points or other non-monetary value from an account or escrow or other transfer, or obtaining any form of value from an electronic wallet. A transaction is initiated by a customer's selection of products or services to purchase. Products and purchases are collectively referred to herein as "items." The customer may signal this selection by initiating a checkout process by, for example, bringing selected products to terminal 542. The checkout process may involve the customer providing retailer 545 with any information necessary to complete the transaction, such as account or wallet information, billing particulars and/or delivery instructions.

In an embodiment, retailer 545 is capable of distributing and accepting digital coupons from a provider 595 even though retailer 545 is a separate and distinct entity from the provider 595 and coupon distributor 515. However, in other embodiments, retailer 545 may be the same as one or both of provider 595 and coupon distributor 515.

4.2. Terminal

Terminal 542 is a computing device operated by a retailer for conducting in-store (i.e. "point of sale" or "brick and mortar") transactions. Terminal 542 may be, for example, a register operated by a sales clerk or a "self-checkout" stand operated by customer 535. Terminal 542 comprises input mechanisms by which a clerk and/or the customer may input information for conducting a transaction, including item identifiers and item quantities. The input mechanisms may include, without limitation, keyboards, pointing devices, touch screens, bar-code readers, cameras, scales, and radio frequency identification ("RFID") readers. Terminal 542 is coupled to a database of item identifiers, in which each item identifier is mapped to one or more prices. Terminal 542 may further comprise or be coupled to one or more payment mechanisms, such as a cash register, check verification system, or credit card reader.

Terminal 542 is coupled to a printing component 549 by which terminal 542 may print receipts of transaction data for transactions, once completed. In an embodiment, a printed receipt may include one or more coupons printed therein. Terminal 542 also or instead includes execution logic for causing electronic transaction receipts to be provided to customer 535 via an electronic address, such as an email address, text messaging address, social messaging address, or URL. For example, terminal 542 may utilize a customer identifier 532 of customer 535 to locate account information that includes the electronic address. Such an account may be stored at, for example, retail server 540 or coupon sever 510. Or, customer 535 may provide the electronic address directly to terminal 542. Terminal 542 may then send the receipt to the electronic address, or provide the transaction details to a server, such as retail server 540 or coupon server 510, that is configured to send the receipt or otherwise make the receipt available to customer 532 at the electronic address. Terminal 542 may cause the digital transaction receipt to include coupon information, such as general links to a coupon distribution website or more specific links from which customer 535 may obtain coupons for specific offer(s) displayed in association with the electronic receipt.

As used herein, "causing" performance of an action may be interpreted as sending, transmitting, or saving data that, when processed by an entity or any combination of entities at least partially triggers functionality at the processing entity or combination of entities that either performs the act or causes performance of the act.

Regardless of the type of receipt generated for transactions at terminal 542, the one or more coupons or coupon offers associated with the receipt may be selected using a variety of techniques, including random selection, selection based on items in the transaction, selection based on the time or date of the transaction, and/or selection based on store location at which the transaction occurs. In an embodiment, terminal 542 requests that another server, such as a retail server 540 or coupon server 510, identify the one or more coupon offers based upon transaction information furnished by terminal 542.

In an embodiment, retailer 545 allows customer 535 to redeem a coupon by presenting a printed or digital coupon at terminal 542 while engaging in an applicable transaction. In an embodiment, retailer 545 allows customer 535 to redeem a coupon by presenting an identifier while engaging in a transaction. Terminal 542 uses the identifier to locate applicable coupon(s) that have been saved to the customer's account. In an embodiment, terminal 542 communicates with coupon server 510 to locate applicable coupon(s) that have been saved to the customer's account. In an embodiment, terminal 542 instead relies upon coupon server 510 to push coupon availability data for various account identifiers to retail server 540. For example, coupon server 510 may periodically provide retail server 540 with a table of account identifiers and newly associated or disassociated digital coupon identifiers. Retail server 540 may then update a local database based on the coupon availability data. Suitable techniques are described, for instance, in U.S. application Ser. No. 12/878,231, filed Sep. 9, 2010, the entire contents of which are hereby incorporated by reference for all purposes as if fully set forth herein.

Terminal 542 periodically, or in response to a transaction, reports coupon usage data to coupon server 510. Coupon usage data indicates the redemption of one or more coupon offers, along with unique identifiers associated with the redemptions, so that coupons may be removed from the redeeming customer's account(s). In an embodiment, terminal 542 is further configured to periodically send transaction data to coupon server 510. The data may include one or more of sales price(s), transaction date(s) and time(s), and identifiers of product(s) or service(s) included in each transaction. The periodic requests may occur hourly, daily, or upon a certain number of transactions, for example.

4.3. Retail Server

In an embodiment, terminal 542 is coupled to retail server 540 via a network, such as a company intranet. In an embodiment, a server may refer to one or more components executing on one or more computers or devices that interact with counterpart client applications executing on other computers or devices. Thus, retail server 540 may refer to one or more server components executed at one or more computing devices under the control of retailer 545. Retail server 540 may coordinate transactions amongst a plurality of terminals 542. Retail server 540 is an optional component of system 500. However, in an embodiment, some or all of the communications to and from terminal 542 pass through retail server 540. In various embodiments, any number of functions described herein as being performed by a terminal such as terminal 542 may in fact be performed, at least in part, by retail server 540. Likewise, any number of functions described herein as being performed by a retail server such as retail server 540 may in fact be performed, at least in part, by terminal 542. In an embodiment, terminal 542 is a "thin client," and all functions other than input and output are shifted to retail server 540.

In an embodiment, retailer 545 host a website via retail server 540, at which customer 535 may access electronic receipts and associated coupon information via one or more web addresses. The website may be provided as a "digital locker" of receipts for transactions in which any of the customer's identifiers have been provided. For example, a customer 535 may login to a website hosted by retail server 540. Once logged in, customer 535 may access a list of recent receipts by visiting a specific web address. The list of receipts may further contain links to web addresses hosted by the retail server 540 or a coupon server 510 at which the customer may obtain coupons for one or more coupon offers. The coupon offers may be non-targeted and/or targeted. In an embodiment, the one or more coupon offers may be selected specifically for the customer in association with the receipt. In an embodiment, such a website may also or instead be hosted by another entity such as coupon server 510. The website may be accessed in response to a notification of the availability of a digital receipt, such as an email, text message, or operating system alert. The website may also or instead be accessed proactively by the user without having received a notification.

In an embodiment, retail server 540, coupon server 510, or any other server described herein may include or be coupled to a variety of different components for implementing the techniques described herein, including database server(s), email or text messaging server components such as an SMTP server component, and web/application server components for responding to requests addressed to various addresses and ports with web pages and/or other data. Web/application server components may rely upon any suitable protocol or application language, including HTTP, HTTPS, SSL, HTML, XML, PHP, Java, JavaScript, SOAP, and so forth.

In an embodiment, retail server 540 comprises executable logic similar to that of the coupon server for generating coupons. For example, coupon distributor 515 may provide one or more libraries of coupon distribution code for retailer 545 to utilize in retail server 540. As a condition of executing such logic, retail server 540 is configured to communicate periodically via an application program interface with coupon server 510, via which coupon server 510 provides retail server 540 with the coupon data necessary for retail server 540 to generate coupons. For example, coupon server 510 may provide retail server 540 with terms of coupon offers for which customers of retail server 540 are currently eligible, instructions for generating a unique coupon identifier for each coupon offer, and/or applicable distribution limits and parameters. Retail server 540 is further configured to report distributions to coupon server 510 on a periodic basis.

In an embodiment, retail server 540 and terminal 542 are special-purpose computers configured with logic that can perform the operations described herein during operation. In an embodiment, client 520 is a general-purpose computer that comprises one or more processors, and memory, mass storage device, or other non-transitory computer-readable storage media storing instructions which, when loaded and executed, cause the one or more processors to perform the operations that are further described herein.

4.4. Coupon Provider/Distributor

In an embodiment, coupon distributor 515 is any entity capable of distributing coupons on behalf of a coupon provider 595, such as a manufacturer, retailer, or advertiser. For the purposes of this disclosure, distributing a coupon may refer to either or both of generating a coupon and saving a coupon offer to a user account in association with one or more account identifiers. In this context, generating a coupon may include printing a coupon or creating and storing digital data representing a digital coupon.

A coupon provider 595 may contract with coupon distributor 515 to distribute coupons as part of a coupon campaign. The coupon provider 595 supplies coupon distributor 515 with coupon distribution data describing the coupon offer(s), as well as parameters for each coupon campaign, such as a target number of coupons to distribute in aggregate, how many coupons may be supplied to each individual end user or device, regional distribution limits, a clearinghouse to use for the campaign, and/or start and end dates for distribution. In an embodiment, coupon distributor 515 makes coupon offers available on behalf of multiple coupon providers 595.

Coupon providers 595 may transmit coupon distribution data to coupon distributor 515 electronically via a network connecting coupon provider 595 to coupon server 510. For example, coupon server 510 may feature a web application, file sharing, or database access component by which providers 595 may upload coupon distribution data directly to coupon server 510 or coupon data store 512. Additionally or alternatively, coupon providers 595 may transmit coupon distribution data to coupon distributor 515 by any other suitable means, including orally over a telephone or via an email.

4.5. Coupon Server

Coupon server 510 is operated by a coupon distributor 515 for, among other purposes, making coupons available to users such as user 535. Coupon server 510 may be one or more server applications, executing at one or more computing devices operated by coupon distributor 515. In an embodiment, coupon server 510 is a special-purpose computer configured with logic that can perform the operations described herein during operation. In an embodiment, coupon server 510 is a general-purpose computer that comprises one or more processors, and memory, mass storage device, or other non-transitory computer-readable storage media storing instructions which, when loaded and executed, cause the one or more processors to perform the operations that are further described herein.

Coupon server 510 makes coupon offers available to users, such as user 535, on behalf of one or more coupon providers 595. In an embodiment, coupon server 510 distributes printable coupons for various offers directly to user 535 via client 520, which is in turn coupled to a printer 529 at which the printable coupons may be printed. Coupon server 510 also makes digital coupons for various offers available to the user 535 by means of saving information identifying digital coupons requested by user 535 to one or more accounts associated with user 535. The user 535 may then provide a retailer 545 with an identifier for the account, such as a store loyalty account number or user name, so that retailer 545 may retrieve any applicable digital coupons during a transaction. Coupon server 510 also makes digital coupons available to the user 535 indirectly, via retailer 545. For example, in response to a retail server 540, operated by retailer 545, requesting a digital coupon on behalf of user 535, coupon server 510 may generate a digital coupon and provide retail server 540 with information about the generated coupon. In other embodiments, coupon server 510 need not necessarily be capable of distributing coupons via any particular technique described herein.

Coupon server 510 receives and responds to coupon-related requests from client 520 and retail server 545 over one or more networks, such as the Internet. Coupon server 510 retrieves coupon data from data store 512 to respond to various requests from client 520 and retail server 545. For example, client 520 may request coupon server 510 to provide a listing of available coupons, search for a coupon based on keywords, save a specified digital coupon to a user account for user 535, or print a specified coupon. In response, coupon server 510 may retrieve any relevant coupon data from data store 512, process the coupon data as appropriate, and, based on that processing, formulate a response to the client. In an embodiment, coupon server 510 hosts one or more web sites for such interactions with client 520. The coupon server 510 sends web pages to a web browser executing at client 520 with instructions for causing the web browser to display various graphical interfaces related to viewing, selecting, printing, and/or saving coupons. In an embodiment, coupon server 520 features an application programming interface ("API") by which a dedicated application at client 520, having its own graphical interfaces, may communicate with coupon server 520.

As another example, coupon server 510 may provide retail server 540 with information about coupon offer terms, digital coupon availability, and customer accounts, via a suitable API. Retail server 540 may, in turn, provide coupon server 510 with data indicating customer coupon redemptions and/or transaction data.

Coupon server 510 may be configured to control coupon distribution in a number of ways. For example, coupon server 510 may be configured to deny a client permission to print the coupon, in accordance with device-based, client-based, or aggregate distribution limits. As another example, coupon server 510 may be configured to deny a request to generate a coupon for a user if an equivalent coupon has already been generated from client 520. Coupon server 510 may further be configured to deny a client permission to print a coupon based on geographic information associated with the client.

Coupon server 510 may use distribution logs for sending distribution reports to coupon providers 595. The form of a distribution report may vary, and may include at least data indicating either a total number of coupons that have been distributed for a particular campaign or a total number of coupons that have been distributed for the particular campaign since the last distribution report. Distribution reports may be sent at varying frequencies, and in some embodiments a report may be sent each time a particular coupon is printed. Distribution reports may further include information harvested from device data made known to coupon server, such as geographic information or client types of the devices to which coupons have been distributed.

Figure 8:
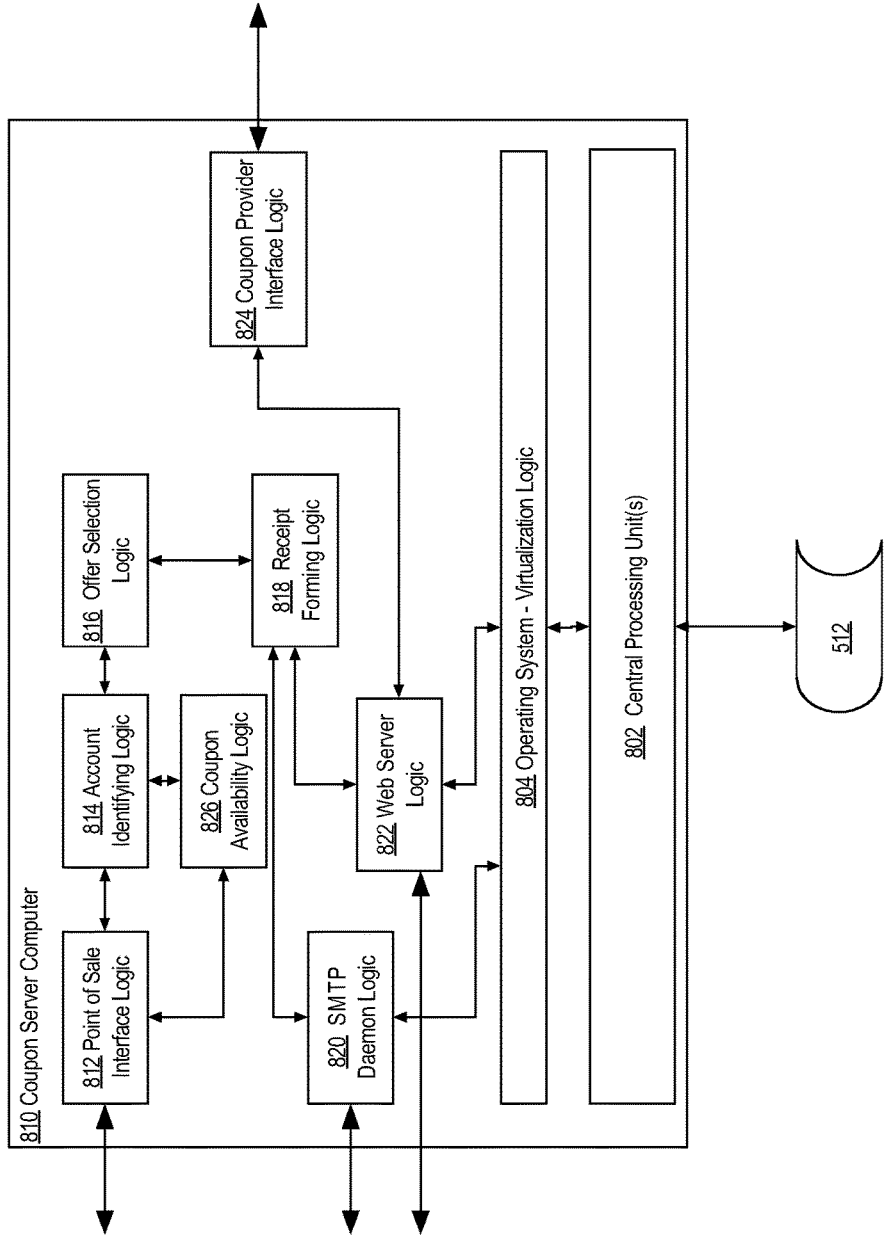
FIG. 8 illustrates a computer configured to implement certain embodiments.

FIG. 8 illustrates a computer configured to implement certain embodiments. In particular, FIG. 8 illustrates an example of coupon server 510 implemented as a special-purpose computer, denoted coupon server computer 810, and comprising one or more central processing units 802, operating system or virtualization logic 804, point of sale interface logic 812, account identifying logic 814, offer selection logic 816, receipt forming logic 818, SMTP daemon logic 820, web server logic 822, coupon availability logic 826, and coupon provider interface logic 824.

In an embodiment, the one or more central processing units 802 comprise CPUs, processor cores, or other instruction processing elements that are capable of interacting with input-output resources such as data store 512. In an embodiment, operating system or virtualization logic 804 comprises any of a server computer operating system, virtualization system such as a hypervisor, or a hardware-based hypervisor such as Intel Xen coupled to a compatible operating system. The point of sale interface logic 812 is configured to communicate with point of sale elements such as retail server 540 (FIG. 5) to receive transaction information including account identifying information and provide digital coupon information as further described for FIG. 4 and in other sections herein. The point of sale interface logic 812 may, in some embodiments, interact with web server logic 822 to post or get requests or responses using HTTP; alternatively, retail-specific communication protocols may be used.

The account identifying logic 814 is coupled to the point of sale interface logic 812 to receive the account identifying information, and has an implicit indirect connection to the OS 804, CPU 802, and data store 512 for the purpose of issuing one or more database queries or other requests to determine if the account identifying information is in the data store. The account identifying logic 814 is further coupled to offer selection logic 816 for providing a request to form and send one or more receipts or coupon offers. The account identifying logic 814 may also couple to the SMTP daemon logic 820, POS logic 812 and/or web server logic 822 for the purpose of forming and sending an email, POS protocol communication, or HTTP post or response to the retail server 540 or client 520 indicating that the account identifying information was recognized.

The coupon availability logic 826 is coupled to the point of sale interface logic 812 to receive the account identifying information, and has an implicit indirect connection to the OS 804, CPU 802, and data store 512 for the purpose of issuing one or more database queries or other requests to determine if the account identifying information is associated with one or more digital coupons saved to an account in the data store. The account identifying logic 814 may also couple to the SMTP daemon logic 820, POS logic 812 and/or web server logic 822 for the purpose of forming and sending an email, POS protocol communication, or HTTP post or response to the retail server 540 or client 520 indicating that the account identifying information is associated with one or more digital coupons saved to an account in the data store.

The offer selection logic 816 is configured to select one or more coupon offers based on a positive recognition of the account identifying information and to signal the receipt forming logic 818 to form an electronic receipt that contains the offers, links to the offers, call-outs for the offers or other indications about how to obtain offers. The SMTP daemon logic 820 is configured to implement an electronic mail protocol such as simple mail transport protocol (SMTP) and exposes an application programming interface (API) with which other elements of the system may request sending emails and may receive, parse, and use the parts of inbound received emails. The web server logic 822 is configured to implement an HTTP server and to serve one or more stored HTML pages, or form and send one or more dynamically generated HTML pages, to the client 520, coupon providers 195, and/or retail server 540. The coupon provider interface logic 824 is configured to couple to coupon providers 195 and to interface with the web server logic 822 and suitable other coupon provider application logic to enable coupon providers to define and store coupon offers in data store 512, and to receive metrics about the use of coupon offers in the described system.

Each element of logic of coupon server computer 810 described above for FIG. 8 may comprise customized hard-wired logic, one or more ASICs or FPGAs, firmware and/or program logic which in combination with the computer system causes or programs computer 810 to be a special-purpose machine. According to one embodiment, the techniques herein are performed by computer 810 in response to CPU 802 executing one or more sequences of one or more instructions contained in main memory. Such instructions may be read into main memory from another storage medium, such as data store 512. Execution of the sequences of instructions contained in main memory causes CPU 802 to perform the process steps described herein. In alternative embodiments, hard-wired circuitry may be used in place of or in combination with software instructions.

4.6. Data Store

Coupon distributor 515 maintains the data supplied by coupon providers 595 as coupon data in data store 512, which is coupled to coupon server 510. Data store 512 may comprise one or more databases and/or file repositories. The coupon data may take a variety of forms, including database records and/or one or more files. Among other aspects, coupon data may comprise, for each coupon offer, data such as the name of the coupon provider 595 making the coupon offer, distribution parameters, terms of the coupon offer, print layout information and graphics, one or more internal or provider identification numbers, bar code generation information, one or more relevant uniform resource locators (URLs), one or more coupon names or titles, one or more related search terms, clearinghouse information, and one or more related categories. Distribution parameters may include aggregate distribution limit values, per device distribution limit values, per region distribution limit values, and/or per client distribution limit values.

Data store 512 further stores user account data. The user account data includes data for one or more different user accounts, each of which may or may not be mapped to a unique user. Some or all of the user accounts may have been established during a registration process with coupon distributor 510. Some or all of the user accounts may instead have been established with a retailer 545, e.g., during an online or in-store registration process, and the details thereof may have been subsequently communicated by the retailer 545 to coupon distributor 510.

Regardless of how the user accounts came into existence, the user account data specifies one or more account identifiers for each user account. The user account data may also specify or otherwise indicate one or more electronic addresses tied to each account. Each account identifier may in turn be associated with data identifying one or more digital coupons that are available to a user. Some or all of the one or more digital coupons may also be associated with other account identifiers associated with the user account. In an embodiment, the digital coupons with which the account identifiers are associated are unique instances of corresponding coupon offers, wherein each unique instance has a unique coupon identifier. For example, just as each coupon that may be printed by coupon server 510 may have a unique coupon number, a unique coupon number may also be generated each time a user saves a digital coupon to the user's account. However, in other embodiments, the digital coupons do not require unique coupon identifiers.

Data store 512 may also store other information related to coupon distribution, including device data and distribution logs. The device data describes a plurality of devices that execute clients for accessing coupon data, such as client 520. Each device may be described by a device identifier. Device data may include information such as hardware identifiers, client identifiers, geographic information, and permissions data. In an embodiment, each device identifier is assigned based on a variety of characteristics of the device, in such a manner as to produce device identifiers that are virtually guaranteed to be unique. In an embodiment, the characteristics from which the device identifier are derived include data that cannot easily be changed, so as to ensure that no single device may print more than its allotted share of coupons simply by changing a network address, data file, computer name, or operating system. In an embodiment, the characteristics from which the device identifiers are derived include hardware identifiers such as serial numbers. Techniques for assigning identifiers are described in, for example, U.S. Patent Publication Number 2010/0124235A1, published May 20, 2010, the contents of which are hereby incorporated by reference for all purposes as if fully set forth herein. In other embodiments, however, a device identifier may in fact be a network address, a Mac address, a computer name, or a unique client identifier that is generated at the time the client is installed.

Distribution logs track the number of coupons that have been distributed for each coupon offer described in the coupon data, including the number of times coupons have been printed and/or the number of times coupon offers have been saved to a user account. Distribution logs may further track how many times each device described in the device data and/or how many times each user described in the user account data has printed coupons for, viewed, and/or saved each coupon offer described in coupon data.

Data store 512 may also store a variety of compensation data. For example, data store 512 may store data indicating, for each coupon, the number of times a retailer 545 has reported the coupon as redeemed. As another example, data store 512 may store balances and account numbers of accounts established by providers 595 from which funds for compensating retailer 545 are to be drawn. Data store 512 may further store account numbers that should be credited in order to provide compensation to retailer 545. Data store 512 may further store a variety of other accounting data.

4.7. Client

Client 520 may be any of a variety of devices, including a personal computer, printer, phone, or portable computing device. In an embodiment, client 520 comprises one or more application components that provide user 535 with an interface to coupon server 510. Client 520 may be, for example, a standalone software application, a web browser, or a plug-in to a web browser. Client 520 need not necessarily be executed by a device that is owned or even exclusively operated by user 535. For example, client 520 may be executed by an in-store kiosk provided to customers by retailer 545.

In an embodiment, client 520 is a special-purpose computer configured with logic that can perform the operations described herein during operation. In an embodiment, client 520 is a general-purpose computer that comprises one or more processors, and memory, mass storage device, or other non-transitory computer-readable storage media storing instructions which, when loaded and executed, cause the one or more processors to perform the operations that are further described herein.

Client 520 communicates with coupon server 510 over a network such as the Internet to receive coupon data. The coupon data sent to client 520 may include, for instance, a listing of information about coupons available to user 535, including offer terms and values, as well as data describing a specific coupon offer in sufficient detail to allow client 520 to print a coupon for the coupon offer at printer 529. Printer 529 is any printing device capable of printing a coupon. Printer 529 may be connected to client 520 via any communication mechanism, or client 520 may be integrated into printer 529.

Client 520 may, using various input or output mechanisms, allow user 535 to view a list of available coupon offers, select a particular coupon offer from that list, and choose whether to print a coupon for the offer, or to save the offer to user 535's account. In response to user 535 selecting the latter option, client 520 may send a request to coupon server 510 to save the selected offer to user 535's account.

In an embodiment, multiple clients 520 may be available to a user, with each client 520 potentially supporting different mechanisms by which the user may access a coupon offer. For example, one client 520 may only allow a user to print coupons via printer 529, another client 520 may only allow a user to save digital coupons to an account, and another client 520 may allow a user to access coupon offers in both ways.

In an embodiment, coupon data and instructions are sent to client 520 from a server at an external website, such as a retail website, instead of coupon server 510. In such an embodiment, client-initiated requests to coupon server 510 may or may not be relayed through such an external website.

In an embodiment, client 520 includes logic for generating a device identifier, as described in the previous section. Client 520 may report this device identifier to coupon server 510 or retail server 540 upon request. Among other purposes, the device identifier may be used by the coupon server 510 for the purpose of enforcing per-device coupon distribution limits.

In an embodiment, client 520 is a wireless, portable, and/or battery powered computing device that the customer commonly keeps with him or her while traveling, such as a phone, tablet, personal digital assistant, watch, and so forth. Client 520 is configured to execute instructions for a graphical coupon client interface by which the customer communicates with coupon server 510. The coupon client interface may be provided by, for instance, a mobile application or a web application.

In an embodiment, client 520 is further configured to execute instructions for a graphical mobile payment interface by which the customer communicates with a payment server during transactions with terminal 542. The mobile payment interface and coupon client interface may be integrated or separate. The interfaces may be activated by customer input such as launching an application or selecting a link in an email, in response to unsolicited communications from coupon server 510, the payment server, and/or in response to signals received from terminal 530. Client 520 may include communication interfaces by which client 520 is capable of communicating with terminal 542 during the transaction to effect payment, receive receipt data, and receive coupon information about available coupon offers upon completion of the transaction. Any suitable communication interface or combination of communication interfaces may be used, including Wi-Fi, cellular data, Bluetooth, Near-Field Communication, and so forth.

In an embodiment, client 520 is further configured to execute instructions for a receipt viewing and management interface by which the customer views receipts for transactions between the customer and one or more retailers. The receipt viewing and management interface may be integrated with or separate from any mobile payment interface and coupon client interface.

4.8. Account Identifiers

Account identifier 532 is a series of characters and/or symbols that uniquely identifies user 535 or a user account associated with user 535. For example, account identifier 532 may identify a retailer's loyalty account, a user account with coupon distributor 515, or both. In the latter case, for instance, account identifier 532 may have been created to identify the retailer's loyalty account, but then subsequently registered with the coupon distributor account, along with potentially other identifiers. Account identifier 532 may or may not also identify or be identified from a physical item, such as a card or personal computing device. In an embodiment, the physical item is any portable item that has an account identifier that can be readily accessed during a transaction.

In an embodiment, account identifier 532 is a number for a card account, such as a credit card account or customer loyalty card account. User 535 may provide identifier 532 during a transaction by, for example, scanning the card at a card reader, typing or stating the numbers on the card, or providing personal information by which the card number may be located, such as a telephone number.

In an embodiment, account identifier 532 is a unique device identifier belonging to a portable computing device. Examples include a mobile phone, laptop or netbook computer, tablet computer, personal digital assistant, flash drive, music player, or camera. For example, the device identifier may be a MAC address, Bluetooth address, serial number, randomly assigned number, and so forth. User 535 may provide identifier 532 during a transaction by, for example, allowing the portable device to broadcast identifier 532 wirelessly to the retailer's checkout system, allowing the retailer to scan the device, or allowing the retailer to see or scan information displayed by the device. In an embodiment, identifier 532 does not necessarily correspond to device hardware, but may rather be provided by a software application executing on the device.

In an embodiment, account identifier 532 is emitted wirelessly by a radio-frequency identifying (RFID) chip or any other mechanism capable of transmitting signals that may be detected during a transaction with retailer 545. For example, the RFID chip may be embedded within a card, device, or other item carried by user 535. The RFID chip may be, for example, a passive NFC tag or active NFC reader.

In an embodiment, coupon distributor 510 allows user 535 to print account identifier 532, or a barcode representation thereof, on a sheet of paper. The paper may then be presented to the retailer 545 during a transaction. Using this approach, user 535 can take advantage of the techniques described herein without having to remember account identifier 532 and without having to present to the retailer 545 an identifying card or device. The paper may or may not be reusable in different transactions at the same or at a different retailer.

In an embodiment, account identifier 532 may be associated with biometric data that uniquely identifies user 535, such as a fingerprint or a retinal scan. Thus, the user may provide the identifier in an embodiment by allowing a retailer to scan user 535 for the biometric data.

4.9. Variations and Alternatives

System 500 as shown in FIG. 5 presents only one embodiment in which the techniques described herein may be practiced. Other embodiments may include additional and/or fewer elements, in potentially different arrangements. As an example, any of coupon provider 595, coupon distributor 515, or retailer 545, may be the same entity, and various other components may therefore be omitted. Furthermore, various processes, such as generating and sending electronic receipts or locating customer account information, may be performed by a server provided by yet a different entity, such as a payment provider or shopping incentive provider, that is not depicted in FIG. 5. Moreover, neither printer 529 nor printing component 549 is necessary to practice many of the techniques described herein, as some embodiments do not include capabilities for printing receipts and/or printing coupons.

5.0. Implementation Examples

5.1. Example Use of Coordinating Computer

Figure 6:
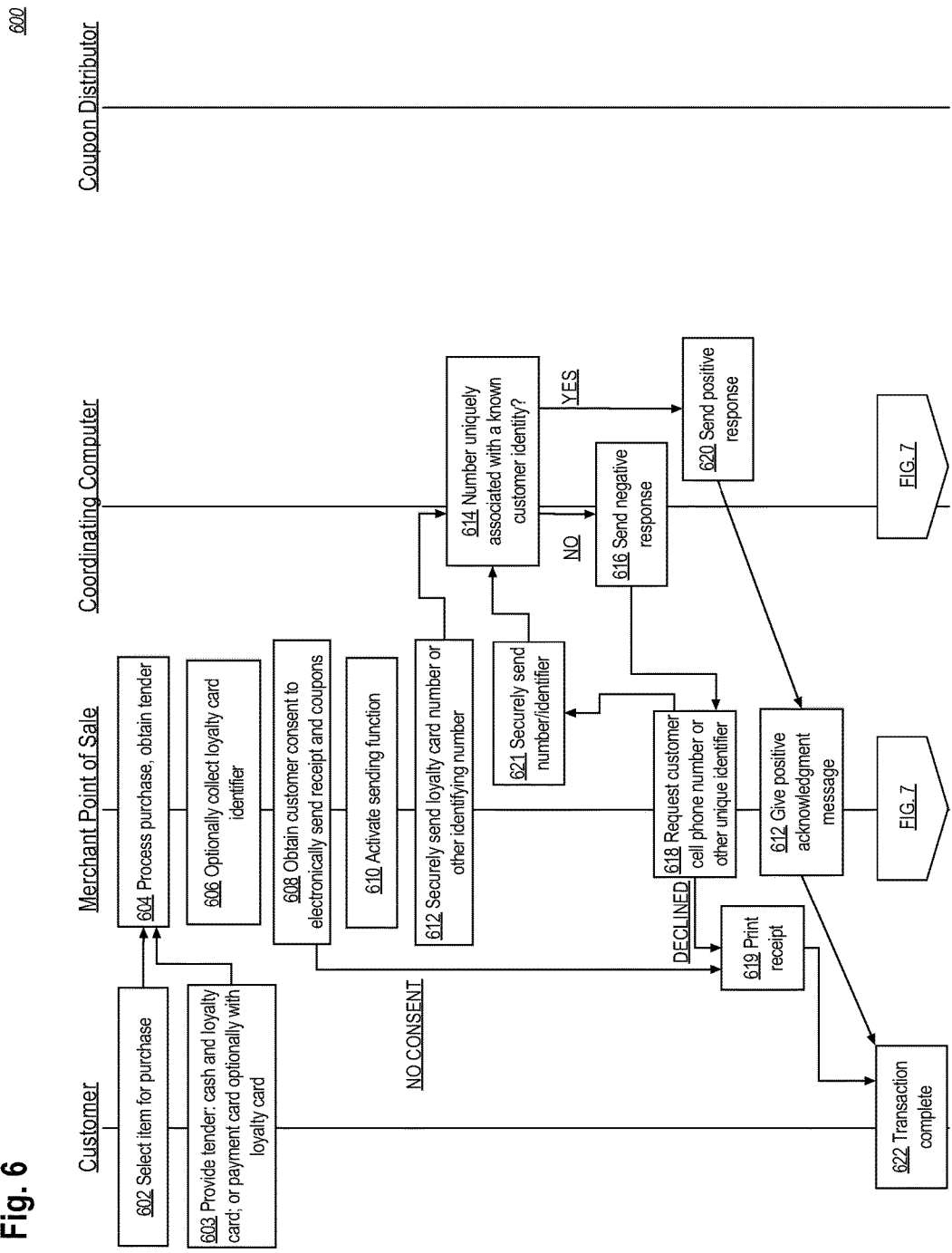
FIG. 6 and FIG. 7 illustrate flows for providing an electronic receipt with coupon information.
Figure 7:
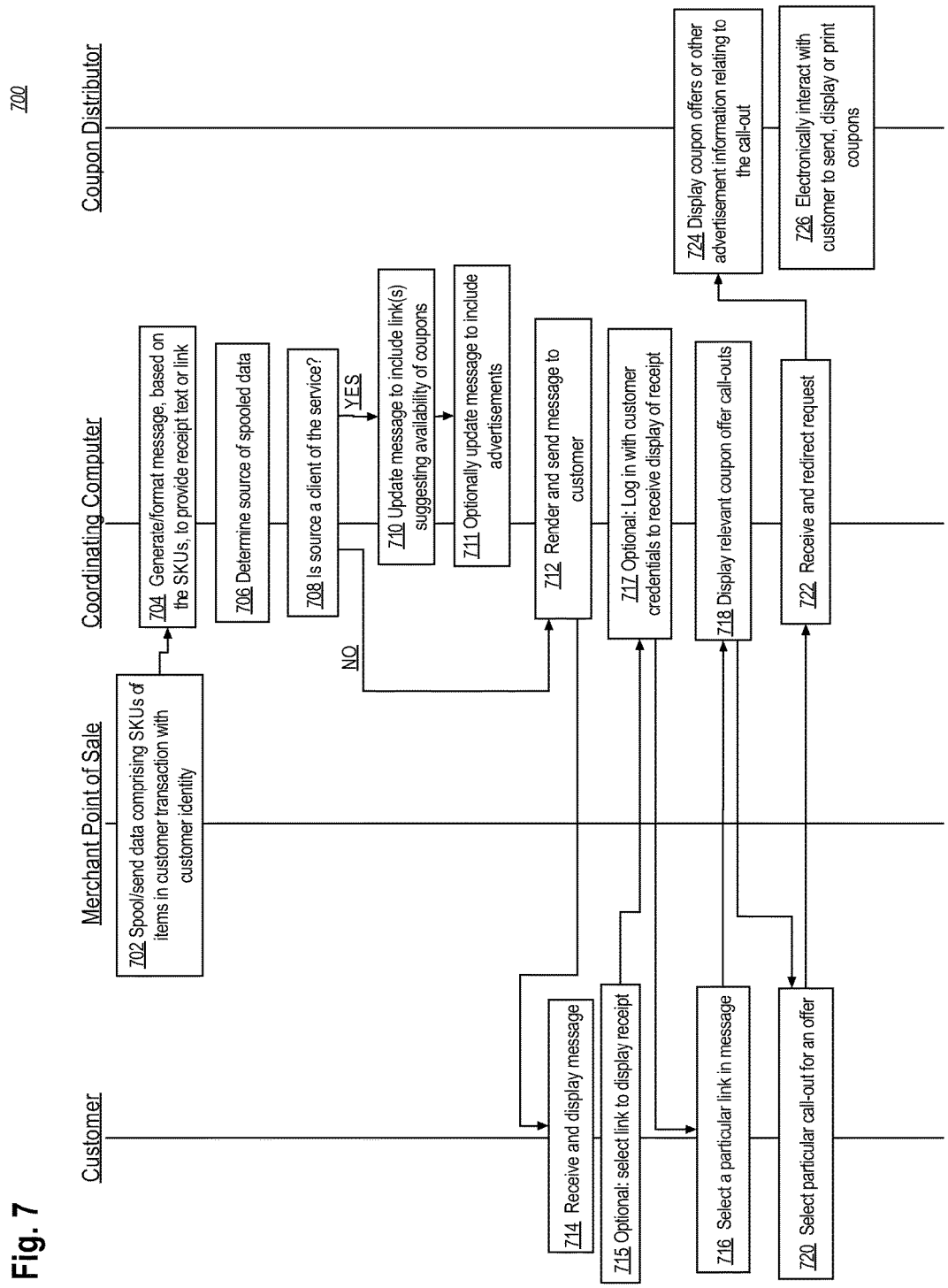

FIG. 6 and FIG. 7 illustrate flows 600 and 700 for providing an electronic receipt with coupon information, according to an embodiment. Flows 600 and 700 are performed by a number of different components of a system, including a customer, merchant point of sale, coordinating computer, and coupon server. The customer may correspond to, for example, user 535. The merchant point of sale may correspond to, for example, terminal 542. Depending upon the embodiment, the coordinating computer may correspond to retail server 540 and/or coupon server 510. The coordinating computer may also or instead correspond to a server operated by yet another party for distribution of electronic receipts on behalf of one or more retailers. The coupon server may correspond, for example, to coupon server 510 or to retail server 540 operating in conjunction with coupon server 510.

Flow 600 begins with block 602, at which the customer selects one or more items for purchase. At block 603, the customer provides tender for the purchase, which may include, for example, cash or credit card(s). The customer also optionally provides a loyalty card. At block 604, the merchant point-of-sale processes the purchase and obtains the tender provided in block 603.

At block 606, the merchant point-of-sale optionally collects an identifier for the loyalty card, if provided. The merchant point-of-sale may do so by, for instance, reading a magnetic strip or RFID tag embedded in the card. At block 608, the merchant point-of-sale obtains customer consent to deliver the customer's receipt and coupon offers electronically. If no consent is given, then at block 619 a receipt is printed. Otherwise, at block 610 the merchant point-of-sale activates a sending function.

At block 612, the sending function commences with the merchant point-of-sale securely sending a loyalty card number or other identifying number to the coordinating computer. At block 614, the coordinating computer determines whether the number is uniquely associated with a known customer identity. If so, then at block 620 a positive response is returned to the merchant point-of-sale. Otherwise, at block 616, the coordinating computer returns a negative response to the merchant point-of-sale.

Upon receiving a negative response per block 616, the merchant point-of-sale may optionally request the customer's cell phone or another identifier, at block 618. If, at block 618, the customer declines to provide a cell phone number or other identifier, flow proceeds to block 619, where the merchant point-of-sale prints a receipt. However, if the customer provides a number or identifier, then at block 621 the merchant point-of-sale may then securely send the number or identifier to the coordinating computer. The coordinating computer may then repeat block 614 with the new number or identifier.

Upon receiving the positive response of block 620, then at block 612 the merchant point-of-sale generates a positive acknowledgment message, such as a message displayed on a screen of the checkout terminal. Once block 619 or 612 is completed, then at block 622 the transaction is considered to be complete. In an embodiment, the transaction is considered complete even if block 619 is not performed (i.e. even if a receipt is not printed), as long as the coordinating computer located a known customer identity in block 614.

Flow 700 is performed upon occurrence of blocks 620/612. Flow 700 begins with block 702, at which the merchant point-of-sale spools data comprising SKUs or other identifiers of items purchased in the customer transaction and sends the data along with the customer identity (or session data that may be used to tie the spooled data to the previously determined customer identity) to the coordinating computer. At block 704, the coordinating computer generates and formats a message, based on the SKUs. The message provides receipt data to the user and/or a link to a URL that may be used to obtain receipt data.

Blocks 706-708 may optionally be performed in embodiments where the coordinating computer provides receipt data to multiple retailers, including retailers that are not subscribed to coupon information services. At block 706, the coordinating computer determines the source of the spooled data. At block 708, the coordinating computer determines whether the source point-of-sale is subscribed to coupon information services. If not, flow proceeds to block 712. Otherwise, flow proceeds to block 710.

At block 710, the coordinating computer updates the message to include link(s) or other data suggesting the availability of coupons. In this particular embodiment, the link(s) simply provide the customer with knowledge of the existence of a website on the coordinating computer at which the customer may obtain coupon offers. At block 711, the coordinating computer optionally updates the message to include advertisements. Advertisements may be identified based on the merchant, customer, or items purchased using any suitable techniques.

At block 712, the coordinating computer renders and sends the message to the customer at an electronic address associated with the customer's identity. At block 714, the customer receives the message and views it. If the receipt data is not embedded directly in the message, then the customer may optionally at block 715 click on a link in the message to display the receipt data. In response, at block 717 the coordinating computer optionally interacts with the customer to obtain customer credentials, and then displays the receipt data upon the customer providing the credentials.

At block 716, the customer selects a particular link in the message or receipt data. In response, at block 718 the coordinating computer displays information about relevant coupon offer(s) associated with the link, including call-out(s) for selecting the relevant offer(s). In response to this display, the customer selects a particular call-out. In response, at block 722 the coordinating computer receives and redirects the selection to the website of the coupon distributor. At block 724, the coupon distributor displays coupon offer(s) or other advertisement information related to the call-out. At block 726, the coupon distributor electronically interacts with the customer to send, display, save, and/or print coupon(s) for the relevant coupon offer(s).

Flows 600 and 700 illustrate a specific example implementation of the techniques already described herein. Other embodiments may include additional or fewer steps performed by potentially different entities in potentially different orders.

5.2. Example Use of Customer Identifier for Both Redemption and Distribution of Coupons In an embodiment, coupon information is provided electronically in association with receipts for transactions at physical stores and/or online stores. A retailer causes performance of a transaction in which one or more items are purchased. An interface configured to accept input indicating a customer identifier associated with the transaction, such as an email address or other customer identifier as described in previous sections, is provided. When input has been received via the interface, it is determined whether the identifier is associated with a known customer identity. If the customer identifier is associated with a known identity, digital coupons associated with that identity are applied against the transaction. An electronic receipt is further provided for the transaction via, for instance, the provided email address or a web-based application in which a session has been established in connection with the identity. Otherwise, a printed receipt may be provided.

Figure 10:
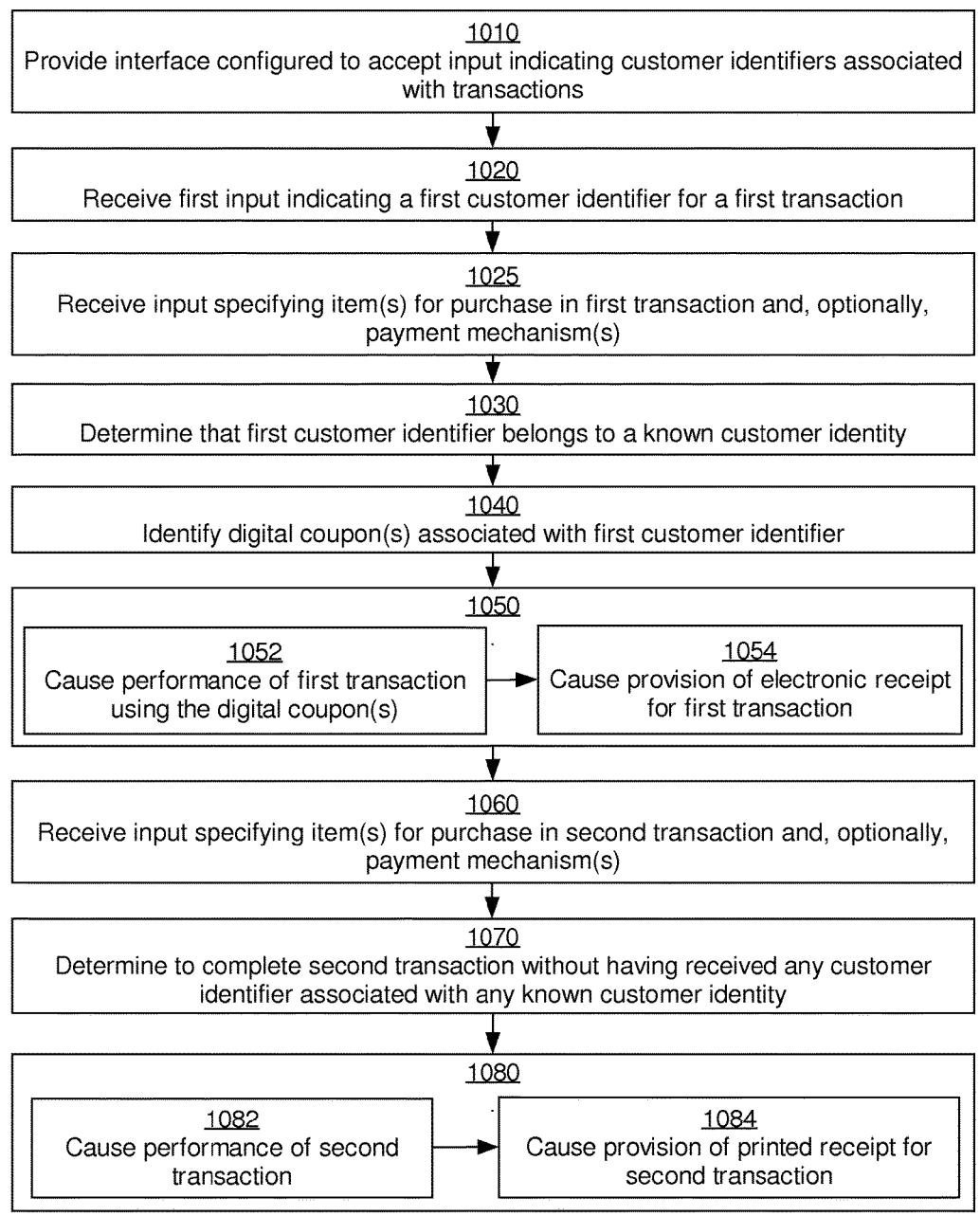
FIG. 10 illustrates a retailer-centric flow for using a single customer identifier to locate digital coupons for redemption in a transaction, and to identify an electronic address at which to provide a digital receipt.

FIG. 10 illustrates a retailer-centric flow 1000 for using a single customer identifier to locate digital coupons for redemption in a transaction, and to identify an electronic address at which to provide a digital receipt, according to an embodiment.

Block 1010 comprises providing an interface configured to accept input indicating customer identifiers associated with transactions. The interface may be provided, for example, in the same manner as the interface of block 330. As with the interface of block 330, the interface need not be furnished by the retailer, as long as the interface is made available for use in transactions with the retailer's customers.

Block 1020 comprises receiving first input via the interface indicating a first customer identifier associated with a first transaction. In the context of this disclosure, "first" is merely a label for purposes of clarity to distinguish one thing from another, and is not intended to imply something that is first in order or first to occur. In an embodiment, the first input specifies an email address or other suitable customer identifier. For example, prior to the completion of the first transaction, a sales clerk may prompt the first customer to input an email address via a keypad interface, or the sales clerk may input the email address as the customer provides the address orally. As another example, the email address may be transferred electronically via a wireless signal, such as in contact information embedded in a NFC transmission. As another example, the email address may be determined at the point of sale by analyzing images or sounds recorded by a sensor. For example, the first customer may present a card or mobile device display screen showing a QR code, bar code, other symbolic representation, or textual representation of the email address and an image of the code or representation may be captured by a scanning interface. Or, the user may generate an audio signal that may be captured by a microphone interface. The terminal or an interface component may then analyze the captured information through various techniques, such as pattern recognition, signal processing, and/or optical character recognition, to decode and/or recognize the email address. Other types of customer identifiers and interfaces may also be utilized, as described elsewhere in this disclosure.

Block 1025 comprises receiving input specifying a first set of one or more items for purchase in the first transaction and, optionally, one or more payment mechanisms. The input may be received in the same manner as the input of block 310. Block 1025 may occur at any time relative to block 1020.

At block 1030, at least partially responsive to receiving the first input via the interface, the flow determines whether the first customer identifier is associated with a known customer identity. For example, upon receiving the first customer identifier, the terminal may query another computer such as a retail server or coupon server using the first customer identifier. The computer may respond with an indication that the first customer identifier corresponds to a known customer identity. As another example, the retail server may query another computer using the first customer identifier.

In either case, the query may take a number of forms. For example, the query may simply request that the other computer respond with a positive or negative indication. Or, the query may request that the other computer respond with an account identifier for the known customer identity. In an embodiment, the query requests information such as a list of digital coupons or payment mechanisms corresponding to the first customer identifier. The other computer may be configured to respond with the requested information if the first customer identifier corresponds to the known customer identity, and to otherwise respond with an indication that the first customer identifier does not correspond to any known customer identity. In an embodiment, the terminal or retail server may itself comprise a database or cache of customer identifiers and known customer identities, which may then be searched using the first customer identifier.

Block 1040 comprises identifying digital coupons, including a first set of one or more digital coupons, associated with the first customer identifier. In an embodiment, the first set of one or more digital coupons are digital coupons that were generated in response to the customer previously selecting coupon offers to save to an account that is mapped to the first customer identifier. However, in other embodiments, the first set of one or more digital coupons is a set of digital coupons that has become associated with the first customer identifier by other mechanisms, such as digital coupons that were generated automatically for the customer in response to previous transactions or retailer-initiated events. The availability of digital coupons for the first customer may be identified by analyzing coupon availability data mapped to the first customer identifier or an account associated with the first customer identifier. For example, a terminal may query a coupon server or retail server for a list of digital coupons that have been saved to an account associated with the first customer identifier. Various techniques for identifying digital coupons associated with an account are described elsewhere in this disclosure, as well as in U.S. application Ser. No. 12/878,231, already incorporated by reference.

In an embodiment, block 1040 and block 1030 are the same, in that the identification of one or more digital coupons associated with the first customer identifier implies that the first customer identifier is associated with a known customer identity. In other embodiments, block 1040 may be performed before or after block 1030.

Block 1050 is performed at least partially responsive to receiving the first input and determining that the first customer identifier is associated with a known customer identity. Block 1050 comprises block 1052 and block 1054. Block 1052 comprises causing performance of the first transaction, in which a first set of one or more items are purchased, at least in part, using the first set of one or more of the digital coupons associated with the particular customer identifier.

In an embodiment, the terms of each of the digital coupons are compared to various properties of the first set of one or more items in the transaction, and it is determined that the first set of one or more coupons are eligible for use in the transaction. In an embodiment, the eligibility of the first set of one or more digital coupons may have been determined in the identification process of block 1040. For example, when querying a retail server or coupon server, a terminal may include transaction details such as a description of the first set of one or more items. When returning the digital coupons in block 1040, a coupon server or retail server may limit the returned digital coupons to only those that are eligible for use in the transaction, based on these transaction details.

Any suitable technique may be used for calculating a total for the first transaction and securing payment, including, without limitation, those described in Section 4 and elsewhere in this disclosure.

Block 1054 comprises causing communicating an electronic receipt for the first transaction via at least one of an email message or a web-based application. The email address for the email message, or the electronic address through which web-based application retrieves the electronic receipt, is determined based on the first customer identifier. For example, if necessary, various lookup operations may be utilized to locate an email address associated with the first customer identifier, or an electronic address and corresponding database record in association with which to save the electronic receipt for later retrieval via a web-based application. Block 1054 may be performed using a variety of techniques described herein, including, without limitation, those described with respect to block 370 of FIG. 3 or block 702 of FIG. 7.

Block 1060 comprises receiving input specifying a second set of one or more items for purchase in a second transaction and, optionally, one or more payment mechanisms. "Second" merely refers to another thing that is different from the first, and does not imply a particular ordinal position or occurrence. The input may be received in the same manner as the input of block 310. Block 1060 may occur at any time relative to blocks 1020-1050.

At block 1070, the flow proceeds to complete the second transaction without having received any customer identifier associated with any known customer identity via the interface(s) of block 1010. For example, the terminal may be configured to proceed with the transaction without a customer identifier if no input has been received after a predetermined time, or if the customer or cashier declines to provide a customer identifier. Such a determination may also occur in response to conditions such as those in block 616, 618, where a provided customer identifier is determined not to be associated with a known customer identity. In an embodiment, the customer may be given an opportunity to establish a known customer identity; however performance of block 1070 would occur if the customer declined to do so.

Block 1080 is performed at least partially responsive to not receiving, via the interface, in association with the second transaction, any input that indicates any customer identifier associated with any known customer identity. Block 1080 comprises block 1082, 1084. Block 1082 comprises causing performing the second transaction, in which a second set of one or more items are purchased. The second transaction is performed in a manner similar to that of the first transaction. However, the second transaction may be performed with or without applying digital or printed coupons. In an embodiment, the second transaction is performed without applying any digital coupons that originated from the same distributor as the digital coupons of block 1040, since the second customer cannot be resolved to a known customer identity at the distributor.

Block 1084 comprises causing communicating a printed receipt for the second transaction. Block 1084 may performed in a manner similar to block 380 of FIG. 3.

Flow 1000 is one example of the variety of possible techniques for conducting a transaction in which an electronic receipt is communicated. Other embodiments may include additional or fewer elements in varying orders. For example, while flow 1000 depicts an embodiment in which the first customer that provides the first customer identifier is always provided with an electronic receipt instead of a printed receipt, other techniques may allow the first customer to select a printed receipt instead of or in addition to an electronic receipt. Similarly, in yet other embodiments, no eligible digital coupons may be returned in block 1040. However, the first customer may obtain an electronic receipt without any digital coupons being applied to the first transaction.

Although flow 1000 is from a retailer-centric perspective, it is not necessary for all of flow 1000 to occur at computing devices operated by the retailer. However, in an embodiment, the entire flow 1000 is performed collectively by a terminal and/or retail server, based on communications with a coupon server or other computer associated with a service provider.

Figure 11:
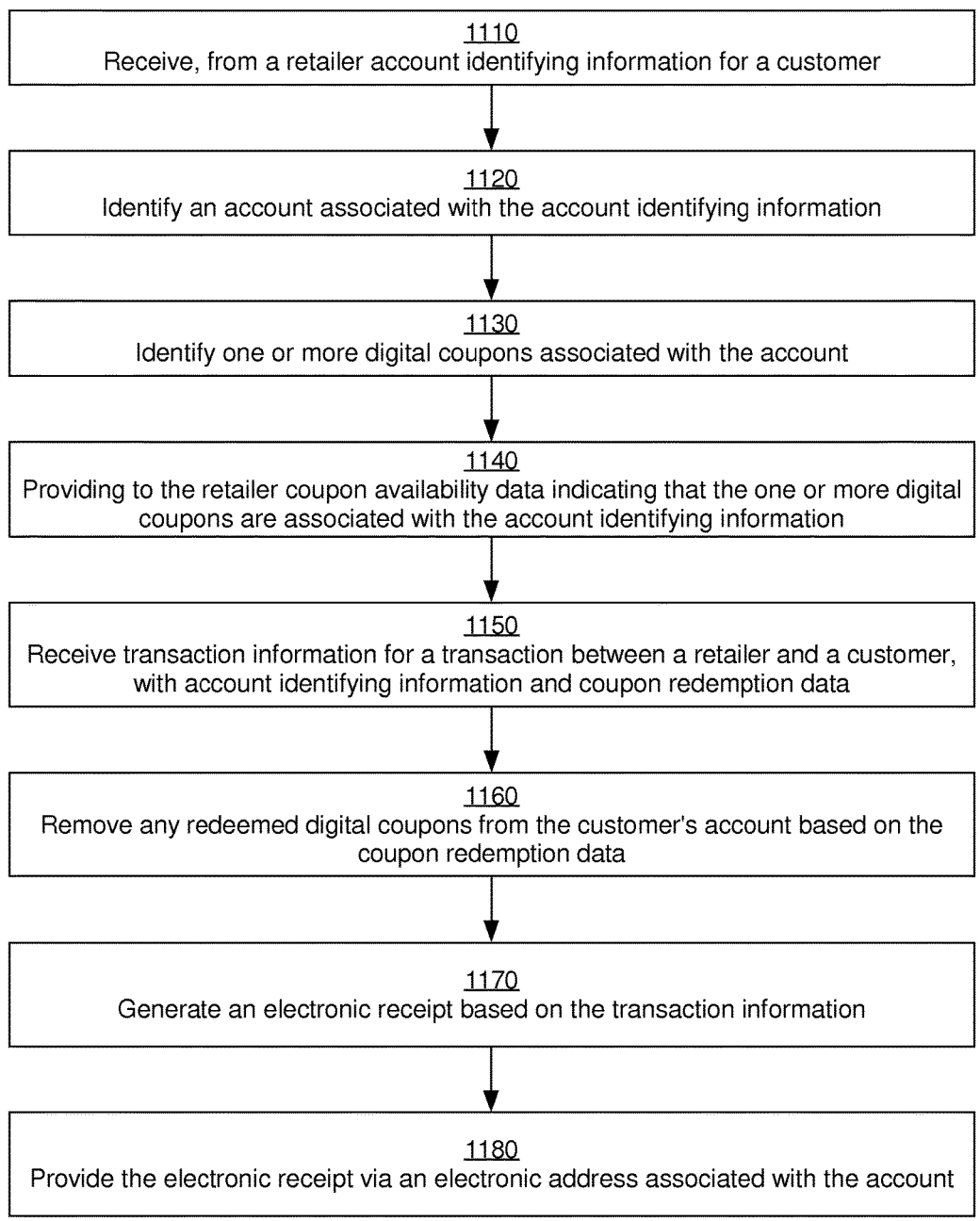
FIG. 11 illustrates a coupon distributor-centric flow for using a single customer identifier to locate digital coupons for redemption in a transaction, and to identify an electronic address at which to provide a digital receipt.

FIG. 11 illustrates a coupon distributor-centric flow 1100 for using a single customer identifier to locate digital coupons for redemption in a transaction, and to identify an electronic address at which to provide a digital receipt, according to an embodiment.

Block 1110 comprises receiving, from a retailer, account identifying information for a customer. The account identifying information may be any type of customer identifier, including without limitation an email address. The account identifying information may be received in any suitable manner, including the manners described with respect to block 410 and elsewhere in this disclosure. Block 1120 comprises identifying an account associated with the account identifying information, such as described in block 420.

Block 1130 comprises identifying one or more digital coupons, which may or may not be associated with the account. The one or more digital coupons may be identified, for instance, by querying a data repository for digital coupon identifiers associated with the account. Block 1140 comprises providing to the retailer coupon availability data indicating that the one or more digital coupons are associated with the account identifying information. The provision of coupon availability data is described elsewhere in this disclosure.

Block 1150 comprises receiving, from the retailer, transaction information for a transaction between the retailer and the customer. The transaction information may comprise transaction data such as described in block 410 and elsewhere in this disclosure, including the account identifying information for the customer.

In an embodiment, the transaction information includes coupon redemption data indicating that the one or more digital coupons were applied to the transaction. Optionally, at block 1160, a coupon server may remove any redeemed digital coupons from the customer's account based on the coupon redemption data. The coupon server may further notify other retailers who may have cached copies of previous coupon availability data for the customer that the redeemed digital coupons are no longer available for the customer. In other embodiments, updating of coupon availability data is instead achieved through various asynchronous backend processes.

Block 1170 comprises generating an electronic receipt based on the transaction information, as described in block 440. The electronic receipt may optionally include coupon information, as described elsewhere in this disclosure, by which the customer may add new digital coupons to the customer's account. Block 1180 comprises providing the electronic receipt via an electronic address associated with the account, as described in block 450. In an embodiment where the account identifying information is an email address, the electronic receipt, or a notification of the electronic address via which the electronic receipt is available, is delivered to the email address.

Flow 1100 is one example of the variety of possible techniques for providing digital coupon information and an electronic receipt. Other embodiments may include additional or fewer elements in varying orders. For example, in an embodiment, blocks 1130-1140 are performed asynchronously to at least blocks 1110, 1150, 1170. Rather than wait for a retailer to request coupon availability data for a customer, the coupon server proactively identifies digital coupons associated with each of multiple customer accounts and pushes the coupon availability data to the retailer in, for example, periodic batches. The coupon availability data is then cached by the retailer. In such an embodiment, block 1110 is an element of block 1150, in that the retailer only needs to communicate with the coupon server once, upon completion of the transaction.

In an embodiment, some of the transaction information of block 1150, including at least the list of item(s) involved in the transaction, is received before the transaction is conducted. The coupon availability data is compared to the list of items and filtered so as to provide the retailer with only a set of those digital coupons that are eligible for use in the transaction. The remainder of the transaction information of block 1150 is transmitted, or the entire transaction information is retransmitted, upon completion of the transaction. Furthermore, because each provided coupon is known to be eligible for the transaction, in an embodiment block 1160 may be performed even without coupon redemption data being included in the transaction information.

5.3. Additional Implementation Examples

In an embodiment, a method comprises: at a retailer, conducting transactions in which electronic receipts are provided for a first set of the transactions and printed receipts are provided for a second set of the transactions; at the retailer, providing one or more interfaces configured to accept input indicating customer identifiers associated with the transactions; wherein conducting a first transaction in the first set of the transactions comprises: receiving first input specifying a first set of one or more items for purchase by a first customer; causing performance of the first transaction, in which the first set of one or more items are purchased; responsive to receiving, via the one or more interfaces, second input indicating that a first customer identifier is associated with the first transaction, querying a server using the first customer identifier; receiving, from the server, a first indication that the first customer identifier is mapped to a known identity at the server; and response to receiving the first indication, causing provision of an electronic receipt to the customer via at least one of an email message or web-based application; wherein causing provision of the electronic receipt comprises sending transaction details for the first transaction to the server, the server configured to use the transaction details to provide the electronic receipt on behalf of the retailer, the server further configured to provide, with the electronic receipt, information about one or more coupon offers selected based on information in the transaction details; wherein conducting a second transaction in the second set of the transactions comprises: receiving third input specifying a second set of one or more items for purchase by a second customer; causing performance of the second transaction, in which the second set of one or more items are purchased; and providing the second customer a printed receipt responsive to receiving a second indication, wherein the second indication indicates at least one of: the second customer has declined to provide any customer identifier via the one or more interfaces; or a second customer identifier provided via the one or more interfaces in association with the second transaction is not associated with any known customer identity at the server; wherein at least the steps of receiving, sending, and providing are performed by one or more computing devices.

In an embodiment, the method further comprises causing provision of the electronic receipt for the first transaction instead of provision of a printed receipt to the first customer. In an embodiment, the first customer identifier is one or more of an email address, customer loyalty card number, payment mechanism used to conduct the transaction, credit card number, radio-frequency identifier, hardware address, or phone number. In an embodiment, the one or more computing devices that perform at least the steps of receiving, providing, and determining include a retail terminal at a physical store and a retail server.

In an embodiment, an apparatus comprises: one or more hardware processing components that implement terminal transaction logic for conducting transactions in which electronic receipts are provided for a first set of the transactions and printed receipts are provided for a second set of the transactions; and one or more interfaces configured to accept input indicating customer identifiers associated with the transactions; wherein conducting a first transaction in the first set of the transactions, in accordance with the terminal transaction logic, comprises: receiving first input specifying a first set of one or more items for purchase by a first customer; responsive to receiving, via the one or more interfaces, second input indicating that a first customer identifier is associated with the first transaction, querying a server using the first customer identifier; receiving, from the server, a first indication that the first customer identifier is mapped to a known identity at the server; and response to receiving the first indication, causing provision of an electronic receipt to the customer via at least one of an email message or web-based application; wherein causing provision of the electronic receipt comprises sending transaction details for the first transaction to the server, the server configured to use the transaction details to provide the electronic receipt, the server further configured to provide, with the electronic receipt, information about one or more coupon offers selected based on information in the transaction details; wherein conducting a second transaction in the second set of the transactions, in accordance with the terminal transaction logic, comprises: receiving second input specifying a second set of one or more items for purchase by a second customer; and providing the second customer a printed receipt responsive to receiving a second indication, wherein the second indication indicates at least one of: the second customer has declined to provide any customer identifier via the one or more interfaces; or a second customer identifier provided via the one or more interfaces in association with the second transaction is not associated with any known customer identity at the server.

In an embodiment, a method comprises: based on coupon distribution data received from a plurality of coupon providers, maintaining, in a data store coupled to a server, coupon data describing coupon offers for distribution via the server, including distribution parameters for the coupon offers; receiving, at the server, queries from a plurality of retailers, each query specifying a customer identifier; responding to each of a first set of the queries with first indications that a respectively specified customer identifier is associated with a known customer identity; responding to each of a second set of the queries with second indications that a respectively specified customer identifier is not associated with any known customer identity; receiving, at the server, transaction information for transactions between customers and the plurality of retailers, the transaction information associating each transaction of the transactions with identifying information for one of the known customer identities; for each particular transaction of the transactions:

identifying, at the server, one or more coupon offers by at least comparing the coupon data with particular transaction details included in the transaction information for the particular transaction; generating, at the server, an electronic receipt based on the particular transaction details, the electronic receipt including or linking to coupon information for obtaining coupons from the server for the identified one or more coupon offers; identifying a particular known customer identity associated with the particular transaction based on particular identifying information that the transaction information associates with the particular transaction; and the server providing the electronic receipt to a customer corresponding to the particular known customer identity by performing at least one of: sending the electronic receipt in an electronic message to an electronic address that is mapped to the particular known customer identify; or sending the electronic receipt to a web-based application for display upon the customer presenting credentials for the particular known customer identity; receiving, at the server, requests to provide coupons for the coupon offers described in the coupon data to customers associated with the known customer identities; the server providing printed coupons and digital coupons in response to at least a subset of the requests to provide coupons; wherein the method is performed by one or more computing devices.

In an embodiment, the server provides the electronic receipt by sending the electronic receipt in an electronic message addressed to one of an email address, a phone number, or a social networking address. In an embodiment, the coupon information includes data describing the identified one or more coupon offers and one or more links by which the customer may request one or more printable coupons or digital coupons for the identified one or more coupon offers from the server. In an embodiment, identifying the one or more coupon offers comprises selecting the one or more coupon offers from the coupon offers described in the coupon data based on: one or more items involved in the particular transaction, a payment method for the particular transaction, customer preferences, retailer preferences, customer purchase history, customer demographics, customer lists, or customer coupon redemption history. In an embodiment, the server provides the electronic receipt by sending the electronic receipt to the web-based application for display upon the customer presenting credentials for the particular known customer identity, wherein providing the electronic receipt further comprises: sending a notification message to the electronic address that is mapped to the particular known customer identify; receiving, at the server, a login request from a client; receiving, at the server, in association with the login request, the credentials for the particular known customer identity; and in response to the server receiving the login request and the credentials, sending the electronic receipt and to the client via the web-based application. In an embodiment, the web-based application is a dedicated mobile application, executing at the client, for communicating with the server to access electronic receipts. In an embodiment, the web-based application is a website from which the customer may access multiple electronic receipts related to multiple transactions at multiple retailers of the plurality of retailers. In an embodiment, the method further comprises automatically saving one or more digital coupons for the identified one or more coupon offers to an account associated with the particular known customer identity. In an embodiment, the one or more computing devices that perform the method collectively implement the server, wherein the server is operated by a coupon distributor, wherein the coupon distributor is separate from the plurality of retailers and the coupon providers. In an embodiment, the method further comprises: receiving, at the server, first transaction information from a first retailer that is not subscribed to coupon services; and based on determining that the first retailer is not subscribed to coupon services, providing first electronic receipts without coupon information for first transactions indicated by the first transaction information. In an embodiment, the electronic receipt further includes a link to an online promotional video that is selected based on the particular transaction details.

In an embodiment, a system comprises: one or more computing devices, wherein the one or more computing devices are coupled by one or more communication networks to retail computing devices operated by a plurality of retailers and user computing devices operated by one or more users; a data store coupled to the one or more computing devices, the data store storing, based on coupon distribution data received from a plurality of coupon providers, coupon data describing coupon offers for distribution via the one or more computing devices, including distribution parameters for the coupon offers; point of sale interface logic configured for: receiving queries from a plurality of retailers, each query specifying a customer identifier; responding to each of a first set of the queries with first indications that a respectively specified customer identifier is associated with a known customer identity; responding to each of a second set of the queries with second indications that a respectively specified customer identifier is not associated with any known customer identity; and receiving transaction information for transactions between customers and the plurality of retailers, the transaction information associating each transaction of the transactions with identifying information for one of the known customer identities; offer selection logic for identifying, for each particular transaction of the transactions, one or more coupon offers by at least comparing the coupon data with particular transaction details included in the transaction information for the particular transaction; receipt forming logic configured for generating, for each particular transaction of the transactions, an electronic receipt based on the particular transaction details, the electronic receipt including or linking to coupon information for obtaining coupons from the server for the identified one or more coupon offers; account identifying logic for identifying, for each particular transaction of the transactions, a particular known customer identity associated with the particular transaction based on particular identifying information that the transaction information associates with the particular transaction; electronic messaging logic for providing, for each particular transaction of the transactions, the electronic receipt to a customer corresponding to the particular known customer identity by performing at least one of: sending the electronic receipt in an electronic message to an electronic address that is mapped to the particular known customer identify; or sending the electronic receipt to a web-based application for display upon the customer presenting credentials for the particular known customer identity; coupon distribution logic for receiving requests to provide coupons for the coupon offers described in the coupon data to customers associated with the known customer identities; and providing printed coupons and digital coupons in response to at least a subset of the requests to provide coupons.

In an embodiment, the electronic messaging logic is configured to provide the electronic receipt by sending the electronic receipt in an electronic message addressed to one of an email address, a phone number, or a social networking address. In an embodiment, the coupon information includes data describing the identified one or more coupon offers and one or more links by which the customer may request one or more printable coupons or digital coupons for the identified one or more coupon offers from the server. In an embodiment, identifying the one or more coupon offers comprises selecting the one or more coupon offers from the coupon offers described in the coupon data based on: one or more items involved in the particular transaction, a payment method for the particular transaction, customer preferences, retailer preferences, customer purchase history, customer demographics, customer lists, or customer coupon redemption history.

In an embodiment, the electronic messaging logic is configured to provide the electronic receipt by sending the electronic receipt to the web-based application for display upon the customer presenting credentials for the particular known customer identity, wherein providing the electronic receipt further comprises: sending a notification message to the electronic address that is mapped to the particular known customer identify; receiving, at the server, a login request from a client; receiving, at the server, in association with the login request, the credentials for the particular known customer identity; in response to the server receiving the login request and the credentials, sending the electronic receipt and to the client via the web-based application.

In an embodiment, the web-based application is a dedicated mobile application, executing at the client, for communicating with the server to access electronic receipts. In an embodiment, the web-based application is a website from which the customer may access multiple electronic receipts related to multiple transactions at multiple retailers of the plurality of retailers. In an embodiment, the coupon distribution logic is further configured to automatically save one or more digital coupons for the identified one or more coupon offers to an account associated with the particular known customer identity. In an embodiment, the one or more computing devices are operated by a coupon distributor, wherein the coupon distributor is separate from the plurality of retailers and the coupon providers. In an embodiment, the point-of-sale interface logic further configured to receive, at the server, first transaction information from a first retailer that is not subscribed to coupon services; and based on determining that the first retailer is not subscribed to coupon services, providing first electronic receipts without coupon information for first transactions indicated by the first transaction information. In an embodiment, the electronic receipt further includes a link to an online promotional video that is selected based on the particular transaction details.

In an embodiment, the system further comprises: for at least a particular retailer of the plurality of retailers, a terminal and a retail server collectively configured to: receiving first input specifying a first set of one or more items for purchase by a first customer; causing performance of a first transaction, in which the first set of one or more items are purchased; responsive to receiving, via the one or more interfaces, second input indicating that a first customer identifier is associated with the first transaction, querying the point-of-sale interface logic using the first customer identifier; receiving, from the point-of-sale interface logic, a first indication that the first customer identifier is mapped to a known customer identity; response to receiving the first indication, sending transaction details for the first transaction to the point-of-sale interface logic; receiving third input specifying a second set of one or more items for purchase by a second customer; causing performance of a second transaction, in which the second set of one or more items are purchased; and providing the second customer a printed receipt responsive to receiving a second indication, wherein the second indication indicates at least one of: the second customer has declined to provide any customer identifier via the one or more interfaces; or a second customer identifier provided via the one or more interfaces in association with the second transaction is not associated with any known customer identity.

In an embodiment, the point-of-sale interface logic is further configured to respond to certain queries that specify the first customer identifier with information identify one or more digital coupons saved in association with the first customer identifier. In an embodiment, the system further comprises a terminal and retail server collectively configured to apply one or more digital coupons received from the point-of-sale interface logic to the first transaction.

In an embodiment, a method comprises: at a retailer, receiving input specifying items for purchase in transactions with customers; at least partially responsive to receiving first input via an interface that is configured to accept at least a first customer identifier associated with a first transaction, determining that the first customer identifier is associated with a known customer identity; identifying one or more digital coupons associated with the first customer identifier; at least partially responsive to receiving the first input and determining that the first customer identifier is associated with a known customer identity: causing performing the first transaction, in which a first set of one or more items are purchased, at least in part, using the one or more digital coupons associated with the particular customer identifier; and causing communicating an electronic receipt for the first transaction via at least one of an email message or a web-based application; and at least partially responsive to not receiving, via the interface, in association with a second transaction, any input that indicates any customer identifier associated with any known customer identity: causing performance of the second transaction, in which a second set of one or more items are purchased; and causing provision of a printed receipt for the second transaction; wherein at least the steps of receiving, providing, and determining are performed by one or more computing devices.

In an embodiment, the customer identifier is an email address, and causing communicating the electronic receipt comprises at least one of: causing sending the email message comprising the electronic receipt to the email address, or causing sending a message to the email address notifying that the electronic receipt is available via the web-based application. In an embodiment, causing communicating the electronic receipt comprises causing sending transaction details for the first transaction to a server, wherein the server is configured to use the transaction details to provide the electronic receipt on behalf of the retailer. In an embodiment, the method further comprises causing providing coupon information with the electronic receipt. In an embodiment, identifying the one or more digital coupons comprises querying a server computer using the customer identifier and receiving, in response to the querying, information identifying the one or more digital coupons. In an embodiment, determining whether the customer identifier is associated with a known customer identity comprises said querying the server computer using the customer identifier.

In an embodiment, a method comprises receiving, from a retailer, account identifying information for a customer; identifying an account associated with the account identifying information; identifying one or more digital coupons associated with the account; providing to the retailer coupon availability data indicating that the one or more digital coupons are associated with the account identifying information; receiving, from the retailer, transaction information for a transaction between the retailer and the customer, the transaction information including the account identifying information and coupon redemption data indicating that the one or more digital coupons were applied to the transaction; generating an electronic receipt based on the transaction information; providing the electronic receipt via an electronic address associated with the account; wherein the method is performed by one or more computing devices.

In an embodiment, the account identifying information is an email address, and providing the electronic receipt comprises at least one of providing the electronic receipt in an email message to the email address or sending a message to the email address notifying the customer that the electronic receipt is available via a web-based application. In an embodiment, the method further comprises providing, in at least one of the electronic receipt or in information for which the electronic receipt comprises a link, data describing one or more coupon offers. In an embodiment, the method further comprises providing, in at least one of the electronic receipt or in information for which the electronic receipt comprises a link, data describing one or more coupon offers; wherein the data describing the one or more coupon offers includes one or more links by which the customer may request performance of saving one or more additional digital coupons for the one or more coupon offers to the account. In an embodiment, the method further comprises: providing, in at least one of the electronic receipt or in information for which the electronic receipt comprises a link, data describing one or more coupon offers; and automatically saving one or more digital coupons for the one or more coupon offers to the account. In an embodiment, the method further comprises: selecting one or more coupon offers for which the customer is eligible based on the transaction information; and providing, in at least one of the electronic receipt or in information for which the electronic receipt comprises a link, data describing the one or more coupon offers. In an embodiment, the one or more computing devices that perform the method are one or more servers operated by a coupon distributor, wherein the coupon distributor is separate from the retailer. In an embodiment, the one or more computing devices that perform the method are one or more servers operated by one or more third-party entities that are separate from the retailer.

In an embodiment, the transaction information is particular transaction information, the transaction is a particular transaction, and the retailer is a particular retailer. The method further comprises: prior to receiving the particular transaction information for the particular transaction, receiving previous transaction information for previous transactions conducted by retailers other than the particular retailer; matching a subset of the previous transactions to the account identifying information; storing a subset of the previous transaction information, corresponding to the subset of the previous transactions, in association with the account identifying information; selecting one or more coupon offers for which the customer is eligible based at least partly on the subset of the previous transaction information, from the retailers other than the particular retailer, that is associated with the account identifying information; and providing, in at least one of the electronic receipt for the particular transaction at the particular retailer or in information for which the electronic receipt for the particular transaction at the particular retailer comprises a link, data describing the one or more coupon offers that were selected based at least partly on the subset of the previous transaction information, from the retailers other than the particular retailer, that is associated with the account identifying information.

In an embodiment, a coupon server computer comprises: point of sale interface logic configured to receive, from a retailer, account identifying information for the customer; account identifying logic coupled to the point of sale interface logic and configured to identify an account associated with the account identifying information; coupon availability logic coupled to the point of sale interface logic configured to identify one or more digital coupons associated with the account; wherein the point of sale logic is further configured to provide to the retailer coupon availability data indicating that the one or more digital coupons are associated with the account identifying information; wherein the point of sale logic is further configured to receive, from the retailer, transaction information for a transaction between the retailer and the customer, the transaction information including the account identifying information and coupon redemption data indicating that the one or more digital coupons were applied to the transaction; receipt forming logic configured to generate an electronic receipt based on the transaction information; electronic messaging logic configured to form and send an electronic message providing access to the electronic receipt via an electronic address associated with the account.

In an embodiment, the account identifying information is an email address, and providing the electronic receipt comprises at least one of providing the electronic receipt in an email message to the email address or sending a message to the email address notifying the customer that the electronic receipt is available via a web-based application. In an embodiment, the electronic messaging logic is further configured to provide, in at least one of the electronic receipt or in information for which the electronic receipt comprises a link, data describing one or more coupon offers. In an embodiment, the electronic messaging logic is further configured to provide in at least one of the electronic receipt or in information for which the electronic receipt comprises a link, data describing one or more coupon offers; wherein the data describing the one or more coupon offers includes one or more links by which the customer may request performance of saving one or more additional digital coupons for the one or more coupon offers to the account. In an embodiment, the electronic messaging logic is further configured to: provide, in at least one of the electronic receipt or in information for which the electronic receipt comprises a link, data describing one or more coupon offers; and automatically save one or more digital coupons for the one or more coupon offers to the account. In an embodiment, the coupon server computer further comprises coupon offer selection logic configured to select one or more coupon offers for which the customer is eligible based on the transaction information; wherein the electronic messaging logic is further configured to provide, in at least one of the electronic receipt or in information for which the electronic receipt comprises a link, data describing the one or more coupon offers. In an embodiment, the electronic messaging logic is further configured to provide the electronic receipt via an electronic address by: sending the electronic message to an electronic address, the electronic message comprising a link configured to send a login request to a server; receiving, at the server, the login request from a client; receiving, at the server, in association with the login request, credentials corresponding to the account; and in response to the server receiving the login request and the credentials, sending the electronic receipt to the client.

6.0. Distributing Promotional Information with Receipts

In an embodiment, various techniques described herein may be used to distribute information about promotional offers in addition to or instead of coupon information. For example, a digital receipt may include or link to promotional videos, images, or other media. The promotions offered may be targeted based on any of the factors described herein, or selected at random. A data repository of promotional offers may be maintained and utilized in a manner similar to that described of the data repository of coupon offers. Promotional offers may or may not be mapped to specific item identifiers.

According to one embodiment, input is received specifying one or more items for purchase by a customer. Based on the input, a transaction is completed in which the one or more items are purchased. An interface configured to accept input indicating a customer identifier associated with the transaction is provided. When input indicating a customer identifier has been received via the interface in association with the transaction, it is determined whether the customer identifier is associated with any electronic address of the customer. When the customer identifier has been received and the customer identifier is associated with an electronic address, promotional information is provided via the electronic address. In an embodiment, some or all of these elements are performed by a retail terminal at a physical store, with possible assistance from a retailer-based server. In an embodiment, servers operated by other entities, including a promotion distributor, may assist in the determining and providing.

In an embodiment, when the customer identifier has been received and the customer identifier is associated with the electronic address, an electronic receipt for the transaction is provided to the customer via the electronic address instead a printed receipt. The electronic receipt includes the promotional information. When no customer identifier has been received, or when a received customer identifier is not associated with any electronic address, a printed receipt is provided for the transaction.

In an embodiment, provision of the promotional information comprises sending an email to the customer with a link to a website at which information for one or more promotional offers may be obtained. In an embodiment, the promotional information includes data describing one or more promotional offers and one or more links by which the customer may take advantage of or find further information about the one or more promotions.

In an embodiment, provision of the promotional information comprises a retailer sending transaction information and an account identifier associated with the customer identifier to a promotion distributor, and the promotion distributor providing the promotional information via the electronic address. In an embodiment, provision of the promotional information comprises the retailer sending account identifying information associated with the customer identifier to a promotion distributor. In response to sending the account identifying information, the retailer receives the promotional information from the promotion provider. The retailer then provides the promotional information with an electronic receipt via the electronic address. In an embodiment, providing the promotional information with the electronic receipt comprises sending the promotional information with the electronic receipt to a mobile device operated by the customer.

In an embodiment, a coordinating computer is queried to determine whether the customer identifier is associated with a known customer identity. The determining of whether the customer identifier is associated with a known customer identity implicitly determines whether the customer identifier is associated with any electronic address of the customer.

In an embodiment, transaction information is received for a transaction between a retailer and a customer, the transaction information including account identifying information. An account associated with the account identifying information is identified. An electronic receipt is generated based on the transaction information. The electronic receipt is provided with promotional information via an electronic address associated with the account. In an embodiment, the promotional information and electronic receipt are provided by a retail server, with possible assistance from a promotions server in identifying the one or more promotional offers. In an embodiment, the promotional information and electronic receipt are provided by a promotions distributor or other entity that is separate from the retailer.

In an embodiment, providing the electronic receipt with the promotional information via the electronic address comprises: sending an email to the electronic address, the email including a link configured to send a login request to a server; receiving, at the server, the login request from a client; receiving, at the server, in association with the login request, credentials corresponding to the account; and in response to the server receiving the login request and the credentials, sending the electronic receipt and promotional information to the client.

In an embodiment, the electronic address is one of an email address, a phone number, a social networking address, or a uniform resource locator. In an embodiment, selection of the one or more promotional offers is based on factors that do not target the behavior of the customer. In an embodiment, selection of the one or more promotional offers is based upon one or more of: the one or more items involved in the transaction, transaction information, customer preferences, retailer preferences, customer purchase history, or customer promotion redemption history. In an embodiment, upon selecting the one or more promotional offers, one or more digital coupons for the one or more promotional offers are automatically saved to the customer's account. In an embodiment, the customer identifier is one of a customer loyalty card number, credit card number, radio-frequency identifier ("RFID"), hardware address, or phone number.

In an embodiment, the method is performed by an entity other than the retailer. Second transaction information is received for a second transaction between a second retailer and the customer, the second transaction information including second account identifying information. The account is identified as being associated with the second account identifying information. Second promotional information is provided via the electronic address associated with the account. The second promotional information may be the same as, or different from, the original promotional information. In an embodiment, the second promotional information is provided with a second and different electronic receipt generated based on the second transaction information.

7.0. Providing Offers Based on Cross-Retailer Tranasactional Data

As described in the previous sections, multiple different retailers may communicate transaction data to a coordinating computer, such as a server operated by a coupon provider, payment provider, shopping incentive provider, or dedicated receipt provider. This data may be collected in customer purchase histories, which, as explained previously, may be used for purposes ranging from creating a "digital locker" of user receipts to selecting offers to present to the user. In some embodiments, transaction data from multiple retailers, or cross-retailer transactional data, can thus be utilized to provide offers to users. For example, in an embodiment, as explained previously, offer selection can be based on both purchase history and a retailer identity. In such cases, offer selection may or may not be filtered to just those offers that pertain to a given retailer. In another embodiment described above, only a purchase history is utilized for offer selection, and thus offer selection is necessarily based on transaction data indiscriminately of the identity of the retailer that provided the transaction data. In yet other embodiments, cross-retailer transactional data may be used to various degrees—for instance, transactional data from certain retailers may be weighted more strongly based on the user's location.

Various specific implementations involving the provision of offers based partly or entirely on cross-retailer transactional data are described in this section. However, the use of cross-retailer transactional data is not limited to these specific implementations, but rather is also compatible with the other systems and techniques previously described.

7.1. Example Method Flow

Figure 12:
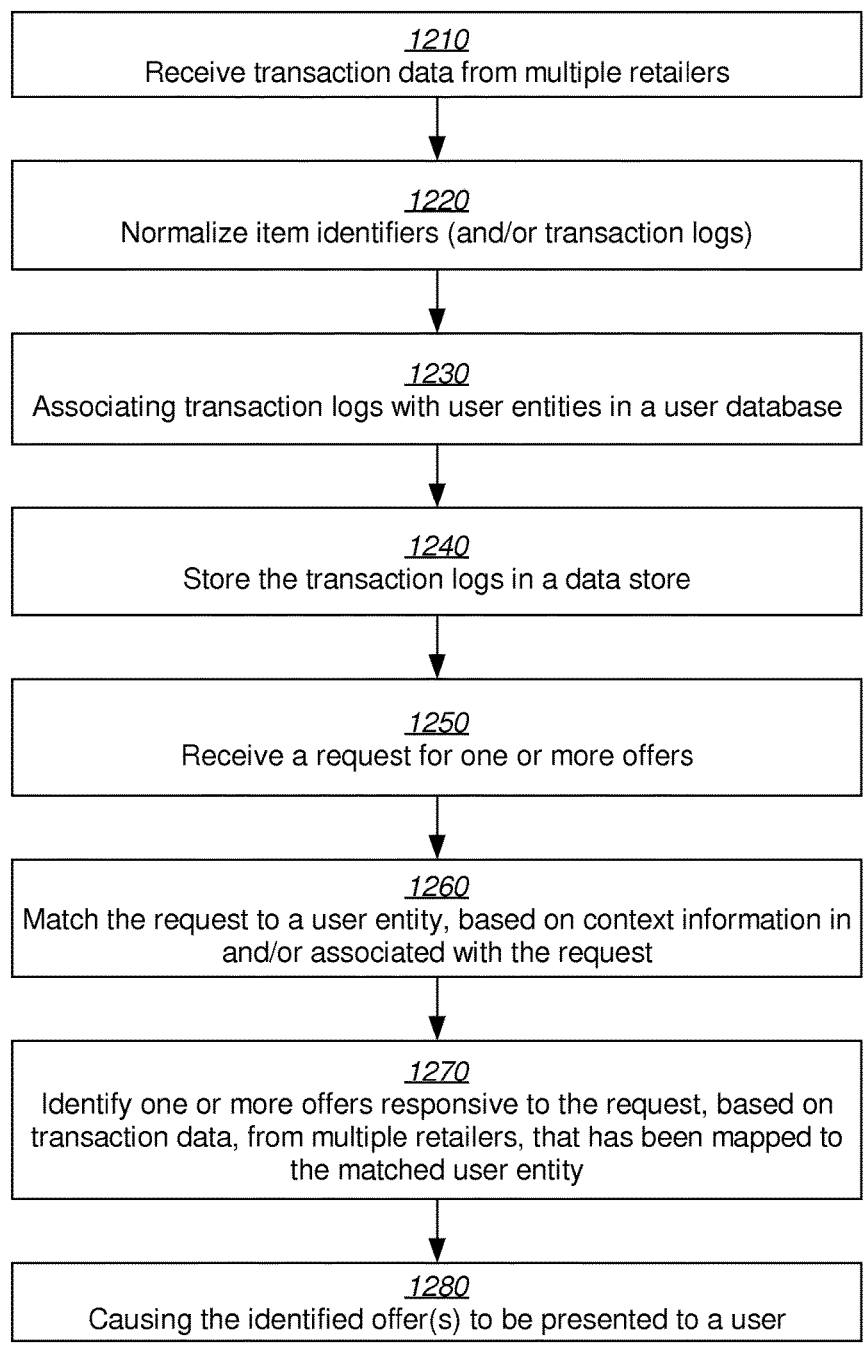
FIG. 12 illustrates a flow 1200 for providing offers based on transactional data gathered from multiple different retailers.

FIG. 12 illustrates a flow 1200 for providing offers based on transactional data gathered from multiple different retailers, according to an embodiment.

Block 1210 comprises receiving, from multiple retailers, transaction data. The transaction data comprises transaction logs from the retailers, each log recording details of a different transaction at a corresponding one of the retailers. Each transaction log comprises basket-level information, including one or more item identifiers for items purchased in the transaction. The items may include products and/or services. Each transaction log further comprises one or more user identifiers, such as a loyalty card identifier, credit card number, coupon account number, name, phone number, email address, IP address, mobile device identifier, and so forth. Each transaction log optionally comprises other transactional informational, including a time, date, retailer identifier, store identifier, geo-location data, and so forth. Block 1210 may be performed, for instance, by a coordinating server as described in other sections, operated as a service for the multiple retailers by a third-party service provider.

Block 1220 comprises optionally normalizing the item identifiers. Different retailers may utilize different proprietary identification schemes to identify various items. For example, one retailer may refer to a specific type of apple as "item A108" while another retailer may refer the specific type of apple as "item 78923." The coordinating server may resolve the discrepancy by normalizing both identifiers to a canonical representation such as "item APPLE10923." The coordinating server may maintain item mapping data that normalizes proprietary item identifiers for specific retailers to canonical item identifiers. Such item mapping data may be provided by each specific retailer, and/or produced by an analysis of the retailer's inventory.

In an embodiment, some or all of the item identifiers already conform to a common identification scheme. For example, the majority of item identifiers may all be Uniform Product Codes (UPCs). Thus, block 1220 is not necessary. In an embodiment, even though some items may have inconsistent identifiers at certain retailers, most items are identified by a consistent identifier at most retailers. Only the items having inconsistent identifiers need be normalized in block 1220. Or, block 1220 may be skipped altogether, and items with inconsistent identifiers are treated as different items for the purposes of the described techniques.

In an embodiment, block 1220 may be part of a larger transaction log normalization process. That is, transaction logs themselves may conform to different formats depending on the retailer. The coordinating server may include one or more transaction log normalization components, to which transaction logs are submitted as they are received. As a result of normalization, the transaction logs all conform to a common format. However, in an embodiment, retailers format transaction logs in the common format before sending the transaction logs to the retailer, and thus the logs do not require normalization.

Block 1230 comprises associating the transaction logs with user entities in a user database. The user database comprises a plurality of user entity objects, each corresponding to a different user entity. Each user entity is mapped to one or more user identifiers. The user identifiers belonging to a specific user entity may have been provided by a user, for example, during an account registration process. Alternatively or additionally, the user identifiers belonging to a user entity may have been learned from the transaction logs over time.

Because many of the user identifiers provided during a transaction may not in fact uniquely or even accurately identify real-world customers, user entities may or may not actually correspond to real-world customers. For example, several different customers in a household may share loyalty card information, and thus a user entity based solely on loyalty card information would correspond to multiple real-world customers. As another example, a phone number given during a checkout process may have once belonged to a different customer with a different transaction history than the customer that is currently using the phone number. A user entity based solely on phone numbers thus would not accurately reflect the real-world customer that is providing the phone number.

In some embodiments, the techniques practiced herein nonetheless produce sufficient results by making assumptions that each of certain types of identifiers, such as credit card identifiers, loyalty card identifiers, or phone numbers, uniquely correspond to a user entity. Thus, block 1230 in these embodiments simply comprises looking up user entities by querying the database using one or more user identifiers provided in each transaction.

In other embodiments, various data-mining techniques may be utilized to try to refine the user database to better reflect real-world customers. Thus, for example, different user entities modeling different members of a household may be associated with the same loyalty card identifier. In such environments, various pattern matching and/or machine learning mechanisms may be used to compute likelihoods that certain transaction logs belong to certain user entities. User entities are then matched to transaction logs based on the computed likelihoods.

Once the user entity that is associated with a transaction log is identified, a unique user entity identifier is then mapped to the associated transaction log and/or a unique transaction identifier is mapped to the associated user entity.

Block 1240 comprises storing the transaction logs in a data store, thereby forming transaction/purchase histories for a plurality of different user entities across a plurality of different retailers. Optionally, block 1240 comprises aggregating data from the transaction logs into summary information that is stored for quicker analysis. For example, such summary information might indicate, without limitation, the number of times a user has purchased an item, a last time the user purchased the item, purchase patterns for the user with respect to the item over time, and correlations between the user's purchase of an item with the user's purchase(s) of other item(s). The transaction data store may be used for a variety of purposes described herein, including performance of the subsequent steps.

In an embodiment, block 1210-1240 is performed in real time with respect to each transaction. That is, as soon as a transaction is performed, the retailer uploads a transaction log to the coordinating server, which then performs blocks 1220-1240. In an embodiment, various stages of blocks 1210-1240 are performed asynchronously relative to transactions. For example, a retailer may batch transaction logs from multiple transactions, and upload those transactions to the coordinating server periodically. The coordinating server may also, in some embodiments, comprise various components that perform blocks 1220-1240 asynchronously with respect to each other, with unprocessed transaction logs being stored in various pools or caches until a next component is ready to process the transaction logs.

Block 1250 comprises receiving a request for one or more offers. The request may be received at an offer/coupon server that has access to the transaction data store, which may or may not be the same as the coordinating server that performed blocks 1210-1240. The request may originate from any suitable source, including end-user based client applications communicating over a wide area network and/or other servers communicating via any type of network. For example, as described in the sections above, the request may originate from a web-based or mobile receipt-viewing application. Or, the request may originate from a coupon application or a shopping list management application executing on a mobile device. Or, the request may originate from a server that is communicating with a client device operated by a customer. Or, as yet another example, the request may originate from an ad platform.

Block 1260 comprises matching the request to a user entity, based on context information in and/or associated with the request. The request may, in some embodiments, comprise data that explicitly specifies the user entity associated with the request. For example, if each user entity is presumed to have a separate loyalty card identifier, the request may simply specify a loyalty card identifier. Or if the request originates from an application that requires the user to login to an account that is uniquely associated with a user entity, the request may simply specify account credentials. In other embodiments, the request includes various context signals, including user identifiers, geolocation data, device identifiers, and so forth. The request may be matched to a user entity in similar manner to the likelihood-based user entity matching technique described with respect to block 1230. In yet other embodiments, context signals for user entity matching are mined from data outside of the request, such as geolocation data and/or items listed in shopping list data previously uploaded from the device issuing the request.

Block 1270 comprises identifying one or more offers responsive to the request, based on transaction data, from multiple retailers, that has been mapped to the matched user entity in the transaction data store. A variety of techniques for utilizing the cross-retailer transactional data are possible. For example, as mentioned previously, the cross-retailer transactional data may be mined for purchase patterns. If a purchase pattern reveals that a user entity frequently buys milk on Tuesday, for instance, and the request is received on a Tuesday, an offer associated with milk may be offered to the user. Advantageously, the use of cross-retailer transactional data allows for better pattern recognition than would be conventionally possible—for example, if the user frequently buys milk from different retailers on Tuesday, it would not have been apparent to any particular one of those retailers that a pattern existed for the user.

As another example, recent transaction logs can be utilized to identify items that are not likely to be purchased by the user in the near future. For example, if the user does proceed to buy milk, and then sends another request for an offer, offers for milk may be suppressed. Similarly, recent transaction logs may be used to identify complimentary items in which the user may be interested. For example, if the user has recently bought milk, the offer server may decide to provide the user with an offer for cookies. Complimentary items may be suggested based on correlations identified in transaction logs associated with the current user entity, similar user entities, or even an entire user base as a whole. Complimentary items may also be specified by offer providers or retailers.

Advantageously, the use of cross-retailer transactional data increases the timeliness of offers. For example, a retailer A would not conventionally have known that a customer just bought milk at retailer B, and thus could have inadvertently provided the user with a milk offer that would be of no interest to the user. By contrast, by participating in the system described herein, the offer server may provide retailer A with an indication of which offer(s) would be of most use to a particular user entity. Retailer A may then proceed to provide the identified offer(s) to the user in, for instance, a receipt, via an offer-distributing web-based or mobile application, or via any other offer distribution mechanism. Similarly, a third-party distributor of coupons and other offers to end-users may leverage the techniques described herein to increase the value of its services to both Retailer A and Retailer B, thus increasing the amount the distributor is able to charge for its services.

In some embodiments, any of the factors described elsewhere in this disclosure may be utilized in conjunction with the cross-retailer transactional data to identify offers responsive to a request, including shopping list data, coupon redemption history, user preferences, and so forth.

Block 1280 comprises causing the identified offer(s) to be presented to a user. The offers are typically presented at a client device in an interface displayed by a web-based or mobile application. The interface may be a receipt-viewing interface, as described herein. Or, the interface may be any other suitable interface, including without limitation a coupon-clipping web page, shopping list management application, ad-delivery interface, and so forth. The offer server performs block 1280 at least partly by sending data describing the identified offer to a client device or web server.

In at least one embodiment, the offers presented to a user, whether on a receipt or in any other form, may have been selected based on transaction data from multiple retailers. In an embodiment, at least one offer that is presented on a receipt was selected based on transaction data from a retailer other than the retailer that engaged in the transaction for which the receipt was generated.

Flow 1200 is but one example technique for providing offers based on cross-retailer transactional data. Other techniques may involve fewer, additional, and/or different elements in potentially varying arrangements.

7.2. Example System

Figure 13:
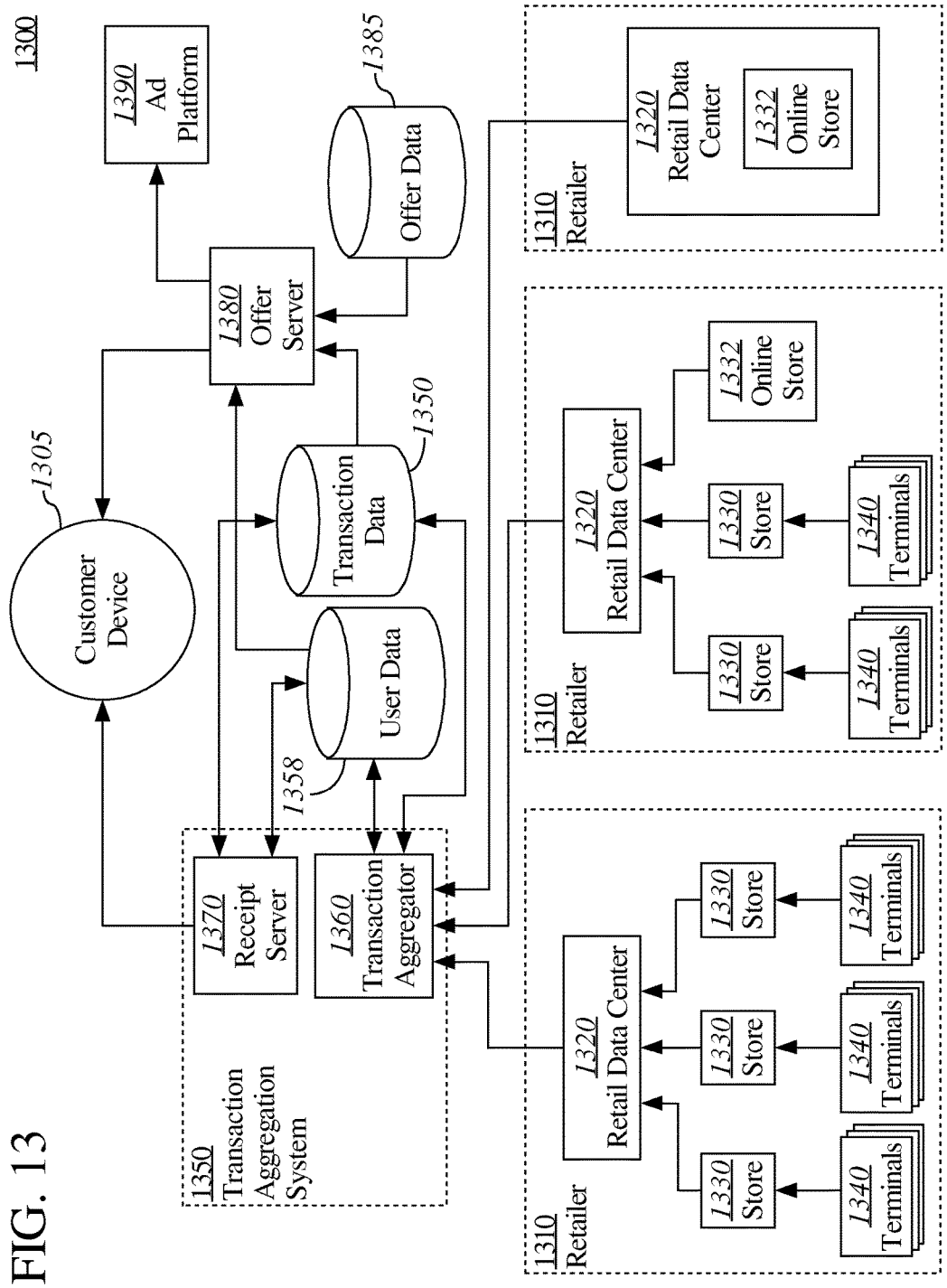
FIG. 13 illustrates a system 1300 for providing offers based on transactional data gathered from multiple different retailers.

FIG. 13 illustrates a system 1300 for providing offers based on transactional data gathered from multiple different retailers, according to an embodiment. System 1300 may be used to practice the various techniques described herein.

System 1300 comprises multiple retailers 1310, each of which operates a different retail data center 1320. Each retail data center 1320 comprises one or more computing devices and one or more databases that collectively operate as a retail server. Each retail data center 1320 is communicatively coupled to one or more brick-and-mortar stores 1330 and/or online stores 1332 via wide area networks and/or direct lines.

Each retail data center 1320, among other aspects, receives transaction data from stores 1330 and/or 1332. The transaction data may be generated by payment terminals 1340 at stores 1330, or by websites or web-based applications at online stores 1332. Payment terminals 1340 may be any device capable of interfacing with the user for the purpose of conducting a transaction, as described herein. For example, payment terminals 1340 may be specialized point-of-sale registers or self-checkout stands. Payment terminals 1340 may also or instead be add-on devices that interface with existing point-of-sale registers or self-checkout stands.

Each store 1330 may further optionally operate a store controller system that interfaces with the various terminals 1340. The store controller may, in concert with retail data center 1320, assist the terminals 1340 in conducting transactions, including by providing information about items and offers, as well as by providing payment processing services. The store controller may collect transaction data from the terminals 1340 and forward it in real time or near real time to a respective data center 1320.

Each retail data center 1320 is also communicatively coupled to a transaction aggregation system 1350 via wide area networks and/or direct lines. The retail data centers 1320 forward some or all of the transaction data received from their respectively corresponding stores to the transaction aggregation system 1350. The transaction data may be processed at the retail data center 1320, or may be unprocessed. The transaction data may be forwarded in real time as it is received, or batched and forwarded at regular intervals.

Transaction aggregation system 1350 is a system of one or more computing devices that implement a transaction aggregator 1360 for processing transaction data as the data arrives and/or causing the transaction data to be stored in transaction data store 1355. Over one or more network interfaces, transaction aggregator 1360 provides one or more transaction reporting application programming interfaces. The data centers 1320 utilize the transaction reporting application programming interfaces to report the transaction logs to transaction aggregator 1360. The stored transaction data may comprise the transaction logs and, optionally, aggregated transaction data from the multiple retailers 1310. In some embodiments, transaction aggregation system 1350 functions as a coordinating server within the meaning described in other sections.

Transaction aggregator 1360 causes various transaction data in transaction data store 1355 to be stored in association with user entities described by user data in user data store 1358. Transaction aggregator 1360 may further update user entity definitions in user data store 1358 based on the transaction data. User data store 1358 and transaction data store 1355 may be stored in a same or different database system.

Transaction aggregation system 1350 further comprises a receipt server 1370 having one or more network interfaces (which may or may not be the same as those that belong to the transaction aggregator 1360) over which receipt server 1370 provides customers 1305 with receipts from the multiple retailers 1310 based on the transaction data in transaction data store 1355 and the user entity data in user data store 1358. Receipts may be provided using any of the techniques described herein.

System 1300 further comprises an offer server 1380 that provides offers to customers 1305. Offer server 1380 may be, for example, one or more computing devices that collectively function as a server. Offer server 1380 includes one or more network interfaces (which may be the same as or different from those of transaction aggregation system 1350) over which it receives requests for offer(s) from client devices and/or other servers. In an embodiment, offer server 1380 provides an offer recommendation application programming interface by which it receives the requests along with, optionally, context information for identifying a user entity that corresponds to the request. In some embodiments, the context information is instead derived from, for example, an IP address or other client identifier. In an embodiment, offer server 1380 is a web server that provides offers embedded within web pages, images, or other containers suitable for presentation at a web client. In an embodiment, offer server 1380 provides raw offer data in formats that are not intended to be presented directly by the requestor, such as XML, SOAP, JSON, and so forth. The requestor then processes this raw offer data and generates its own presentation of the offers identified by offer server 1380.

In some embodiments, a coupon server such as described herein may function as an offer server 1380. In other embodiments, a coupon server distributes coupons separately from the offer server 1380. That is, offer server 1380 simply identifies and provides information about offers in response to requests for offers. A customer 1305 must separately access a coupon server if the customer 1305 wishes to obtain a coupon for an offer recommended by offer server 1380.

Offer server 1380 accesses records describing offers within an offer data store 1385, which may have been populated with data from offer providers and/or offer aggregation services. Offer server 1380 compares data from offer data store 1385, transaction data store 1355, and user data store 1358 to match one or more offers to specific requests for offers. In an embodiment, when providing a customer with an offer, offer server 1380 bases the selection of the offer on transaction data from transactions by the customer at two or more different more different retailers 1310.

Offer server 1380 may receive requests for offer recommendations directly from devices operated by customers 1305. Offer server 1380 may also or instead receive requests from other servers that are interfacing with devices operated by customers 1305, including receipt server 1370 and/or ad platform 1390. Depending on where offer server 1380 is deployed, offer server 1380 may communicate directly with user data store 1358 and/or transaction data store 1355, or offer server 1380 may request data via the transaction aggregation system 1350.

In an embodiment, offer server 1380 and receipt server 1370 are in fact the same server. In other embodiments offer server 1380 and receipt server 1370 are separate and distinct servers, and may even be operated by different providers. In an embodiment, multiple different offer servers 1380 may make use of the transaction data in transaction data store 1355.

Ad platform 1390 is a set of one or more servers that deliver ads to users via, for instance, websites or mobile applications. Offer server 1380 may be part of ad platform 1390, or may be entirely separate from offer server 1380. Offer server 1380 and ad platform 1390 may be operated by the same entity, or by different providers.

System 1300 is but one example system for providing offers based on cross-retailer transactional data. Other systems may involve fewer, additional, and/or different elements in potentially varying arrangements. For example, other systems may comprise many more retailers 1310 having many more stores 1330 and/or additional online stores 1332. Additional customers 1305 may access offer server 1380 and/or receipt server 1370 with additional devices. As another example, in an embodiment, payment terminals 1340 are configured to communicate directly with transaction aggregator 1360 over a wide area network. For instance, payment terminals 1340 may be specialized terminals deployed by, and potentially even subsidized by, the operator of transaction aggregation system 1350. In an embodiment, some or all retailers 1310 may not have a retail data center 1320. Rather, individual stores 1330 and/or 1332 communicate directly with transaction aggregation system 1350. In an embodiment, offer server 1380 communicates with retailer data centers 1320 to recommend offers and/or make offer terms known to retailers 1310.

7.3. Additional Examples

In an embodiment, a system comprises: a transaction aggregator component comprising a first set of one or more computer devices; wherein the transaction aggregator component provides a transaction application programming interface configured to receive, over a first set of one or more network interfaces, transaction data from a multiple different retail data centers; a user database storing records describing user entities; a transaction database storing records describing the transaction data; wherein the transaction data comprises transaction logs from stores that report to the multiple different retail data centers, each transaction log of the transaction data recording details of a different transaction at a corresponding one of the stores; wherein the transaction aggregator component is configured to associate particular transaction logs with particular user entities in the user database and update the transaction database based on the transaction data received from the multiple different retail data centers; a receipt server comprising a second set of one or more computer devices configured to send receipt data to customer devices over a wide area network coupled to over a second set of one or more network interfaces, based on transaction logs; an offer server comprising a third set of one or more computer devices; wherein the offer server exposes an offer recommendation application programming interface configured to receive receiving requests for one or more offers over a third set of one or more network interfaces; wherein the offer server is configured to match a particular request of the requests to a particular user entity of the user entities, based on context information in and/or associated with the request; wherein the offer server is configured to identify one or more offers responsive to the request, based at least partially on identifying particular transaction data in the transaction database, from the multiple retail data centers, that is associated with the matched user entity; and wherein the offer server is configured to provide information describing the identified one or more offers in response to the request.

In an embodiment, a method comprises: receiving, from multiple retailers, transaction data comprising transaction logs from the retailers, each transaction log of the transaction data recording details of a different transaction at a corresponding one of the retailers; associating the transaction logs with user entities in a user database; storing the transaction logs in a transaction data store, the transaction data store thereby comprising transaction histories for a plurality of different user entities of the user entities across the multiple retailers; receiving a request for one or more offers; matching the request to a particular user entity of the user entities, based on context information in and/or associated with the request; identifying one or more offers responsive to the request, based at least partially on identifying transaction data, from the multiple retailers, that is associated with the matched user entity in the transaction data store; providing information describing the identified one or more offers in response to the request.

8.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
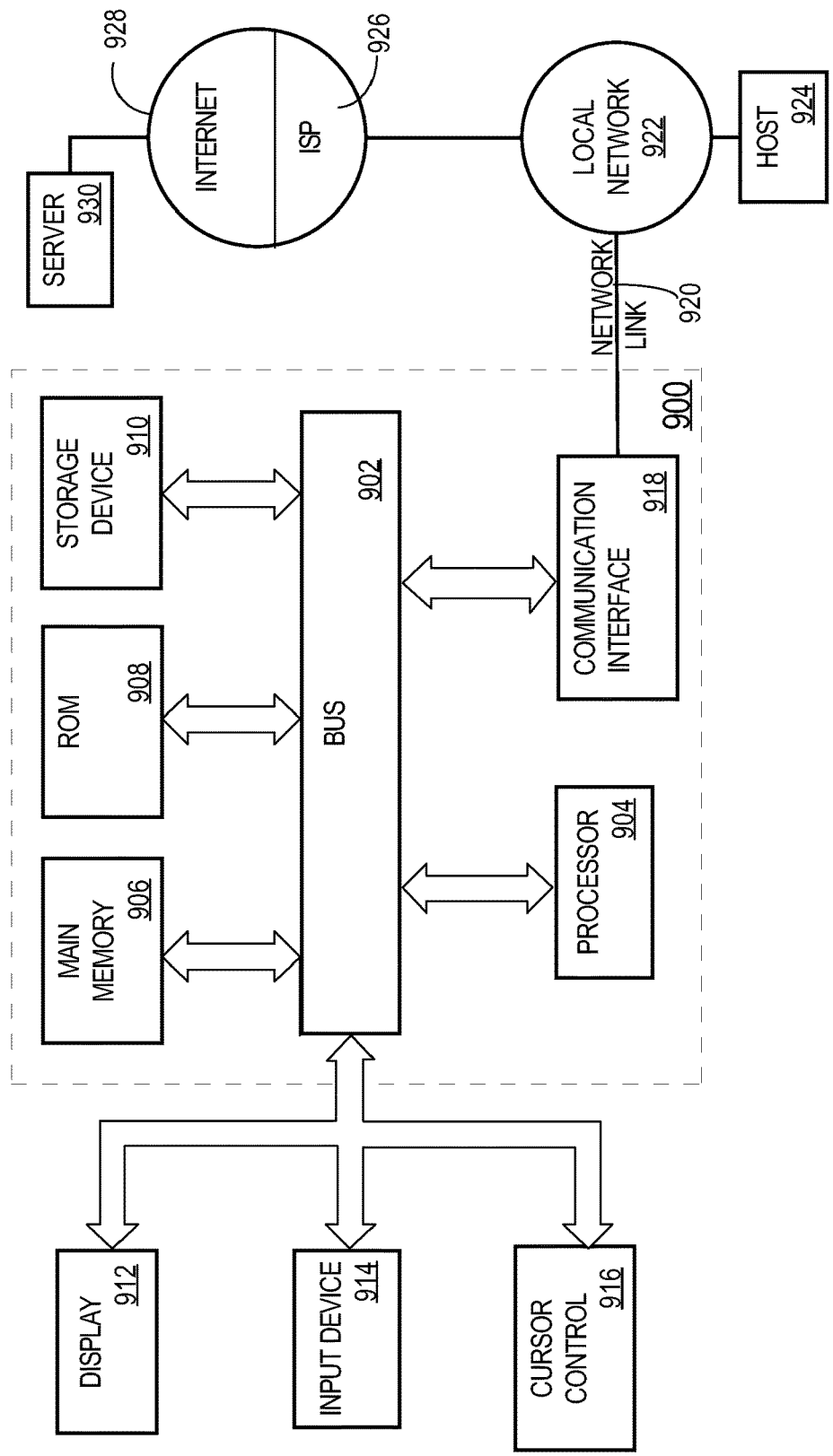
FIG. 9 is block diagram of a computer system upon which embodiments of the invention may be implemented.

For example, FIG. 9 is a block diagram that illustrates a computer system 900. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

9.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this disclosure, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer system comprising:
   a transaction aggregator component comprising a first set of one or more computer devices;
   wherein the transaction aggregator component provides a transaction application programming interface configured to receive, over a first set of one or more network interfaces, transaction data from a plurality of different retail data centers;
   a user database storing records describing user entities;
   a transaction database storing records describing the transaction data;
   wherein the transaction data comprises transaction logs from stores that report to the plurality of different retail data centers, each transaction log of the transaction data recording details of a different transaction at a corresponding one of the stores;

wherein the transaction aggregator component is configured to associate and to store particular transaction logs with particular user entities in the user database, normalize disparate item identifiers in the transaction logs to canonical item identifiers, and update the transaction database based on the transaction data received from the plurality of different retail data centers, the receiving, associating, storing, normalizing, and updating being performed in real time;

a receipt server comprising a second set of one or more computer devices configured to send receipt data to customer devices over a wide area network coupled to a second set of one or more network interfaces, based on transaction logs;

an offer server comprising a third set of one or more computer devices;

wherein the offer server exposes an offer recommendation application programming interface that is configured to receive requests to distribute one or more offers;

wherein the offer recommendation application programming interface is further configured to receive requests for the one or more offers over a third set of one or more network interfaces;

wherein the offer server is configured to match a particular request of the requests from a specific device to a particular user entity of the user entities, based on context information in and/or associated with the request, the context information including a shopping list previously uploaded by the specific device;

wherein the offer server is configured to identify one or more offers responsive to the request based on at least one of:

purchase patterns that have been identified for the particular user entity based on transaction logs, received from the plurality of different retailer data centers, that were associated with the particular user entity, comparing items in which the particular user has recently expressed an interest to item correlations discovered in transaction logs, received from the plurality of different retailer data centers, that were associated with the particular user entity, or de-emphasizing items recently purchased in the transaction logs, received from the plurality of different retailer data centers, that were associated with the particular user entity;

wherein the offer server is configured to provide information describing the identified one or more offers in response to the request, receiving a selection of the one offer from the specific device;

redirecting the selection to a coupon distributor computer of the one offer.

2. The computer system of claim 1, wherein the transaction aggregator component provides a mobile application to a mobile device which causes:

sending the request from the mobile device responsive to user input that accesses at least one of: a receipt displayed at the mobile device, a shopping list displayed at the mobile device, or a coupon list displayed at the mobile device; and sending information about the one or more identified offers responsive to the request.

3. The computer system of claim 1, further comprising wherein the offer server exposes an offer recommendation application programming interface that is further configured to receive requests for the one or more offers from a web server.

4. A method comprising:

receiving over a network, at a transaction aggregation system comprising one or more server computers from a plurality of different retailer server computers associated with a plurality of different retailers, transaction data comprising transaction logs from the plurality of different retailers, each transaction log of the transaction data recording details of a different transaction at a corresponding one of the plurality of different retailers;

normalizing disparate item identifiers in the respective transaction logs from proprietary item identifiers to canonical item identifiers, using digitally programmed logic of the transaction aggregation system, associating the transaction logs with user entities in a user database;

storing the transaction logs in a transaction data store in digital memory of the transaction aggregation system, the transaction data store thereby comprising transaction histories for a plurality of different user entities of the user entities across the plurality of different retailers, the receiving, normalizing, associating, and storing being performed in real time;

receiving over a network, from an offer provider that is different than the plurality of different retailers, at the transaction aggregation system, a request to distribute one or more offers;

receiving over a network, at the transaction aggregation system, a request for the one or more offers from a specific device;

using digitally programmed logic of the transaction aggregation system, matching the request to a particular user entity of the user entities, based on context information in and/or associated with the request, the context information including a shopping list previously uploaded by the specific device;

using digitally programmed logic of the transaction aggregation system, identifying the one or more offers responsive to the request based on at least one of:

purchase patterns that have been identified for the particular user entity based on transaction logs, received from the plurality of different retailers, that were associated with the particular user entity, comparing items in which the particular user has recently expressed an interest to item correlations discovered in transaction logs, received from the plurality of different retailers, that were associated with the particular user entity, or de-emphasizing items recently purchased in the transaction logs, received from the plurality of different retailers, that were associated with the particular user entity;

using digitally programmed logic of the transaction aggregation system, providing information describing the identified one or more offers in response to the request;

receiving a selection of the one offer from the specific device;

redirecting the selection to a coupon distributor computer of the one offer.

5. The method of claim 4, further comprising:
sending the request from a mobile device responsive to user input that accesses at least one of: a receipt displayed at the mobile device, a shopping list displayed at the mobile device, or a coupon list displayed at the mobile device; and
causing the mobile device to display information about the one or more identified offers responsive to the request.

6. The method of claim 4, further comprising receiving the request from a web server.

7. One or more non-transitory computer-readable media storing instructions that, when executed by one or more computing devices, cause:
receiving over a network, at a transaction aggregation system comprising one or more server computers from a plurality of different retailer server computers associated with a plurality of different retailers, transaction data comprising transaction logs from the plurality of different retailers, each transaction log of the transaction data recording details of a different transaction at a corresponding one of the plurality of different retailers;
normalizing disparate item identifiers in the respective transaction logs from proprietary item identifiers to canonical item identifiers,
associating the transaction logs with user entities in a user database;
storing the transaction logs in a transaction data store in digital memory of the transaction aggregation system, the transaction data store thereby comprising transaction histories for a plurality of different user entities of the user entities across the plurality of different retailers,
the receiving, normalizing, associating, and storing being performed in real time;
receiving over a network, from an offer provider that is different than the plurality of different retailers, at the transaction aggregation system, a request to distribute one or more offers from a specific device;
receiving over a network, at the transaction aggregation system, a request for the one or more offers;
matching the request to a particular user entity of the user entities, based on context information in and/or associated with the request,
the context information including a shopping list previously uploaded by the specific device;
identifying the one or more offers responsive to the request based on at least one of:
purchase patterns that have been identified for the particular user entity based on transaction logs, received from the plurality of different retailers, that were associated with the particular user entity,
comparing items in which the particular user has recently expressed an interest to item correlations discovered in transaction logs, received from the plurality of different retailers, that were associated with the particular user entity, or
de-emphasizing items recently purchased in the transaction logs, received from the plurality of different retailers, that were associated with the particular user entity;
providing information describing the identified one or more offers in response to the request,
receiving a selection of the one offer from the specific device;
redirecting the selection to a coupon distributor computer of the one offer.

8. The one or more non-transitory computer-readable media of claim 7, wherein the instructions, when executed by the one or more computing devices, further cause:
sending the request from a mobile device responsive to user input that accesses at least one of: a receipt displayed at the mobile device, a shopping list displayed at the mobile device, or a coupon list displayed at the mobile device; and
causing the mobile device to display information about the one or more identified offers responsive to the request.

9. The one or more non-transitory computer-readable media of claim 7, wherein the instructions, when executed by the one or more computing devices, further cause receiving the request from a web server.

* * * * *

UNITED STATES PATENT AND TRADEMARK OFFICE
CERTIFICATE OF CORRECTION

PATENT NO. : 10,346,874 B2  
APPLICATION NO. : 13/831716  
DATED : July 9, 2019  
INVENTOR(S) : Steven R. Boal Page 1 of 1

It is certified that error appears in the above-identified patent and that said Letters Patent is hereby corrected as shown below:

On the Title Page

IN THE TITLE:
Delete "CHECKOUT-BASED DISTRIBUTED OF DIGITAL PROMOTIONS" and insert
-- CHECKOUT-BASED DISTRIBUTION OF DIGITAL PROMOTIONS --.

Signed and Sealed this
Fifteenth Day of October, 2019

Andrei Iancu
*Director of the United States Patent and Trademark Office*